US012776860B2

(12) United States Patent
Zhang et al.

(10) Patent No.: US 12,776,860 B2
(45) Date of Patent: Oct. 27, 2026

(54) REQUEST BASED REDUNDANCY AND EARLY TERMINATION FOR OUTER CODING

(71) Applicant: QUALCOMM Incorporated, San Diego, CA (US)

(72) Inventors: Qian Zhang, Basking Ridge, NJ (US); Junyi Li, Greentown, PA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 286 days.

(21) Appl. No.: 18/604,841

(22) Filed: Mar. 14, 2024

(65) Prior Publication Data

US 2025/0293805 A1 Sep. 18, 2025

(51) Int. Cl.
*H04L 1/08* (2006.01)

(52) U.S. Cl.
CPC .................................... *H04L 1/08* (2013.01)

(58) Field of Classification Search
None
See application file for complete search history.

(56) References Cited

U.S. PATENT DOCUMENTS

| | | | | |
|---|---|---|---|---|
| 10,177,784 B2 * | 1/2019 | Hwang | ............. | H03M 13/6508 |
| 2017/0195082 A1 * | 7/2017 | Roh | ...................... | H03M 13/09 |
| 2018/0254870 A1 * | 9/2018 | Dutz | ..................... | H04L 5/0051 |
| 2024/0014932 A1 * | 1/2024 | Yeo | ........................ | H04L 5/0055 |
| 2024/0187934 A1 * | 6/2024 | Yi | ..................... | H04W 72/1263 |
| 2025/0247740 A1 * | 7/2025 | Löhr | ................... | H04L 43/0852 |

* cited by examiner

*Primary Examiner* — Brian S Roberts
(74) *Attorney, Agent, or Firm* — Holland & Hart LLP

(57) ABSTRACT

Methods, systems, and devices for wireless communication are described. A user equipment (UE) may transmit a message requesting redundancy for one or more source symbols of a later transmission, and may receive the source symbols and one or more parity symbols in response. If the UE successfully decodes the source symbols while the full set of requested parity symbols (or any retransmissions) are still being transmitted, or if the UE receives a quantity of symbols indicating a probability of successful decoding above a threshold, the UE may send feedback requesting early termination of the redundant transmissions. An amount of redundancy may be requested based on historical data, predicted traffic characteristics, as well as channel state information (CSI). Requests for early termination may also be sent after expiration of a timer or after a time window, and may include one or more retransmissions.

20 Claims, 14 Drawing Sheets

REQUEST BASED REDUNDANCY AND EARLY TERMINATION FOR OUTER CODING

FIELD OF TECHNOLOGY

The following relates to wireless communication, including request based redundancy and early termination for outer coding.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support request based redundancy and early termination for outer coding. For example, the described techniques provide for reducing complexity at a network entity by enabling a UE to transmit requests for redundancy, while also freeing up resources by enabling requests for early termination of redundant transmissions. For example, a UE may transmit a message requesting redundancy for a set of source symbols of a later transmission, and may receive one or more source symbols and one or more parity symbols in response. If the UE successfully decodes data while one or more of the full set of requested parity symbols (or any retransmissions) are still being transmitted, or if the UE receives a quantity of symbols indicating a probability of successful decoding above a threshold, the UE may send feedback requesting early termination of redundant transmissions. In some cases, an amount of redundancy may be requested by the UE based on historical data, predicted traffic characteristics, as well as CSI at the UE. Further, requests for early termination may be sent after expiration of a timer or after a time window following successful decoding or reception of one or more symbols, or based on feedback, and may include one or more retransmissions.

A method for wireless communication by an apparatus (e.g., a UE) is described. The method may include transmitting a control message including a request for outer coding of source symbols of a data set and indicating a requested quantity of redundancy parity symbols for the data set, receiving, via a set of multiple symbols, a first data set including outer-encoded data, the set of multiple symbols including a set of multiple source symbols and one or more redundancy parity symbols that correspond to the requested quantity of redundancy parity symbols, and decoding the outer-encoded data received via the set of multiple source symbols and at least one of the one or more redundancy parity symbols to obtain a message.

An apparatus (e.g., a UE) is described. The apparatus may include one or more memories storing processor executable code, and one or more processors coupled with the one or more memories. The one or more processors may individually or collectively be operable to execute the code to cause the apparatus to transmit a control message including a request for outer coding of source symbols of a data set and indicating a requested quantity of redundancy parity symbols for the data set, receive, via a set of multiple symbols, a first data set including outer-encoded data, the set of multiple symbols including a set of multiple source symbols and one or more redundancy parity symbols that correspond to the requested quantity of redundancy parity symbols, and decode the outer-encoded data received via the set of multiple source symbols and at least one of the one or more redundancy parity symbols to obtain a message.

Another apparatus is described. The apparatus may include means for transmitting a control message including a request for outer coding of source symbols of a data set and indicating a requested quantity of redundancy parity symbols for the data set, means for receiving, via a set of multiple symbols, a first data set including outer-encoded data, the set of multiple symbols including a set of multiple source symbols and one or more redundancy parity symbols that correspond to the requested quantity of redundancy parity symbols, and means for decoding the outer-encoded data received via the set of multiple source symbols and at least one of the one or more redundancy parity symbols to obtain a message.

A non-transitory computer-readable medium storing code for wireless communication is described. The code may include instructions executable by one or more processors to transmit a control message including a request for outer coding of source symbols of a data set and indicating a requested quantity of redundancy parity symbols for the data set, receive, via a set of multiple symbols, a first data set including outer-encoded data, the set of multiple symbols including a set of multiple source symbols and one or more redundancy parity symbols that correspond to the requested quantity of redundancy parity symbols, and decode the outer-encoded data received via the set of multiple source symbols and at least one of the one or more redundancy parity symbols to obtain a message.

Some examples of the method, apparatuses (e.g., UEs), and non-transitory computer-readable medium described herein may further include operations, features, means, or instructions for transmitting a second control message requesting termination of transmission of one or more subsequent redundant parity symbols of the first data set based on successful decoding of the outer-encoded data to obtain the message.

Some examples of the method, apparatuses (e.g., UEs), and non-transitory computer-readable medium described herein may further include operations, features, means, or instructions for transmitting a third control message requesting termination of transmission of the one or more subsequent redundant parity symbols of the first data set based on a time duration elapsing or expiration of a timer following transmission of the second control message.

Some examples of the method, apparatuses (e.g., UEs), and non-transitory computer-readable medium described herein may further include operations, features, means, or instructions for transmitting uplink control information (UCI) requesting feedback for the third control message.

Some examples of the method, apparatuses (e.g., UEs), and non-transitory computer-readable medium described herein may further include operations, features, means, or instructions for transmitting a second control message requesting termination of transmission of one or more subsequent redundant parity symbols of the first data set based on successful decoding of at least a defined quantity of the set of multiple symbols of the first data set.

In some examples of the method, apparatuses (e.g., UEs), and non-transitory computer-readable medium described herein, the second control message may be transmitted subsequent to a time window elapsing after successful decoding of at least the defined quantity of the set of multiple symbols of the first data set, the time window corresponding to a quantity of slots, a quantity of symbol periods, or a quantity of time.

In some examples of the method, apparatuses (e.g., UEs), and non-transitory computer-readable medium described herein, the second control message may be transmitted based on an expiration of a timer after successful decoding of at least the defined quantity of the set of multiple symbols of the first data set.

In some examples of the method, apparatuses (e.g., UEs), and non-transitory computer-readable medium described herein, the control message requests a first quantity of redundancy parity symbols for one or more data sets communicated during a first time window and a second quantity of redundancy parity symbols for one or more data sets communicated during a second time window.

In some examples of the method, apparatuses (e.g., UEs), and non-transitory computer-readable medium described herein, the requested quantity of redundancy parity symbols may be determined by a machine learning model based on historical data, a predicted traffic level, blockage data, a handover prediction, or any combination thereof.

In some examples of the method, apparatuses (e.g., UEs), and non-transitory computer-readable medium described herein, the requested quantity of redundancy parity symbols may be based on channel quality, channel state information (CSI), latency, a drop rate, or any combination thereof.

In some examples of the method, apparatuses (e.g., UEs), and non-transitory computer-readable medium described herein, the control message requests a first quantity of redundancy parity symbols for the first data set and a second quantity of redundancy parity symbols for a second data set.

In some examples of the method, apparatuses (e.g., UEs), and non-transitory computer-readable medium described herein, the control message includes UCI, a medium access control (MAC) control element (MAC-CE), or a radio resource control (RRC) message.

In some examples of the method, apparatuses (e.g., UEs), and non-transitory computer-readable medium described herein, the control message may be an aperiodic control message or the control message may be one of a set of multiple control messages that may be periodically transmitted.

A method for wireless communication by an apparatus (e.g., a network entity) is described. The method may include obtaining a control message including a request for outer coding of source symbols of a data set and indicating a requested quantity of redundancy parity symbols for the data set and outputting, via a set of multiple symbols, a first data set including outer-encoded data, the set of multiple symbols including a set of multiple source symbols and one or more redundancy parity symbols that correspond to the requested quantity of redundancy parity symbols.

An apparatus (e.g., a network entity) is described. The apparatus may include one or more memories storing processor executable code, and one or more processors coupled with the one or more memories. The one or more processors may individually or collectively be operable to execute the code to cause the apparatus to obtain a control message including a request for outer coding of source symbols of a data set and indicating a requested quantity of redundancy parity symbols for the data set and output, via a set of multiple symbols, a first data set including outer-encoded data, the set of multiple symbols including a set of multiple source symbols and one or more redundancy parity symbols that correspond to the requested quantity of redundancy parity symbols.

Another apparatus for wireless communication is described. The apparatus may include means for obtaining a control message including a request for outer coding of source symbols of a data set and indicating a requested quantity of redundancy parity symbols for the data set and means for outputting, via a set of multiple symbols, a first data set including outer-encoded data, the set of multiple symbols including a set of multiple source symbols and one or more redundancy parity symbols that correspond to the requested quantity of redundancy parity symbols.

A non-transitory computer-readable medium storing code for wireless communication is described. The code may include instructions executable by one or more processors to obtain a control message including a request for outer coding of source symbols of a data set and indicating a requested quantity of redundancy parity symbols for the data set and output, via a set of multiple symbols, a first data set including outer-encoded data, the set of multiple symbols including a set of multiple source symbols and one or more redundancy parity symbols that correspond to the requested quantity of redundancy parity symbols.

Some examples of the method, apparatuses (e.g., network entities), and non-transitory computer-readable medium described herein may further include operations, features, means, or instructions for obtaining a second control message requesting termination of transmission of one or more subsequent redundant parity symbols of the first data set and terminating transmission of the one or more subsequent redundant parity symbols of the first data set based on the second control message.

Some examples of the method, apparatuses (e.g., network entities), and non-transitory computer-readable medium described herein may further include operations, features, means, or instructions for obtaining UCI requesting feedback for a second control message that requests termination of transmission of one or more subsequent redundant parity symbols of the first data set and outputting a feedback message indicating whether the second control message was successfully received.

Some examples of the method, apparatuses (e.g., network entities), and non-transitory computer-readable medium described herein may further include operations, features, means, or instructions for obtaining UCI including feedback associated with decoding of at least a defined quantity of the set of multiple symbols of the first data set and terminating transmission of one or more subsequent redundant parity symbols of the first data set based on a quantity of successfully received symbols indicated by the feedback satisfying a threshold quantity of received symbols or based on a quantity of estimated successfully decoded symbols satisfying a threshold quantity of decoded symbols.

In some examples of the method, apparatuses (e.g., network entities), and non-transitory computer-readable medium described herein, the control message requests a first quantity of redundancy parity symbols for one or more data sets communicated during a first time window and a second quantity of redundancy parity symbols for one or more data sets communicated during a second time window.

In some examples of the method, apparatuses (e.g., network entities), and non-transitory computer-readable medium described herein, the control message requests a first quantity of redundancy parity symbols for the first data set and a second quantity of redundancy parity symbols for a second data set.

In some examples of the method, apparatuses (e.g., network entities), and non-transitory computer-readable medium described herein, the control message includes UCI, a MAC-CE, or an RRC message.

In some examples of the method, apparatuses (e.g., network entities), and non-transitory computer-readable medium described herein, the control message may be an aperiodic control message or the control message may be one of a set of multiple control messages that may be periodically transmitted.

A method for wireless communication by an apparatus (e.g., a UE) is described. The method may include receiving, via a set of multiple symbols, a first data set including outer-encoded data, the set of multiple symbols including a set of multiple source symbols and one or more redundancy parity symbols, decoding the outer-encoded data received via the set of multiple source symbols and at least one of the one or more redundancy parity symbols to obtain a message, and transmitting a control message requesting termination of transmission of one or more subsequent redundant parity symbols of the first data set based on successful decoding of the outer-encoded data to obtain the message.

An apparatus (e.g., a UE) is described. The apparatus may include one or more memories storing processor executable code, and one or more processors coupled with the one or more memories. The one or more processors may individually or collectively be operable to execute the code to cause the apparatus to receive, via a set of multiple symbols, a first data set including outer-encoded data, the set of multiple symbols including a set of multiple source symbols and one or more redundancy parity symbols, decode the outer-encoded data received via the set of multiple source symbols and at least one of the one or more redundancy parity symbols to obtain a message, and transmit a control message requesting termination of transmission of one or more subsequent redundant parity symbols of the first data set based on successful decoding of the outer-encoded data to obtain the message.

Another apparatus is described. The apparatus may include means for receiving, via a set of multiple symbols, a first data set including outer-encoded data, the set of multiple symbols including a set of multiple source symbols and one or more redundancy parity symbols, means for decoding the outer-encoded data received via the set of multiple source symbols and at least one of the one or more redundancy parity symbols to obtain a message, and means for transmitting a control message requesting termination of transmission of one or more subsequent redundant parity symbols of the first data set based on successful decoding of the outer-encoded data to obtain the message.

A non-transitory computer-readable medium storing code for wireless communication is described. The code may include instructions executable by one or more processors to receive, via a set of multiple symbols, a first data set including outer-encoded data, the set of multiple symbols including a set of multiple source symbols and one or more redundancy parity symbols, decode the outer-encoded data received via the set of multiple source symbols and at least one of the one or more redundancy parity symbols to obtain a message, and transmit a control message requesting termination of transmission of one or more subsequent redundant parity symbols of the first data set based on successful decoding of the outer-encoded data to obtain the message.

DETAILED DESCRIPTION

Figure 1:
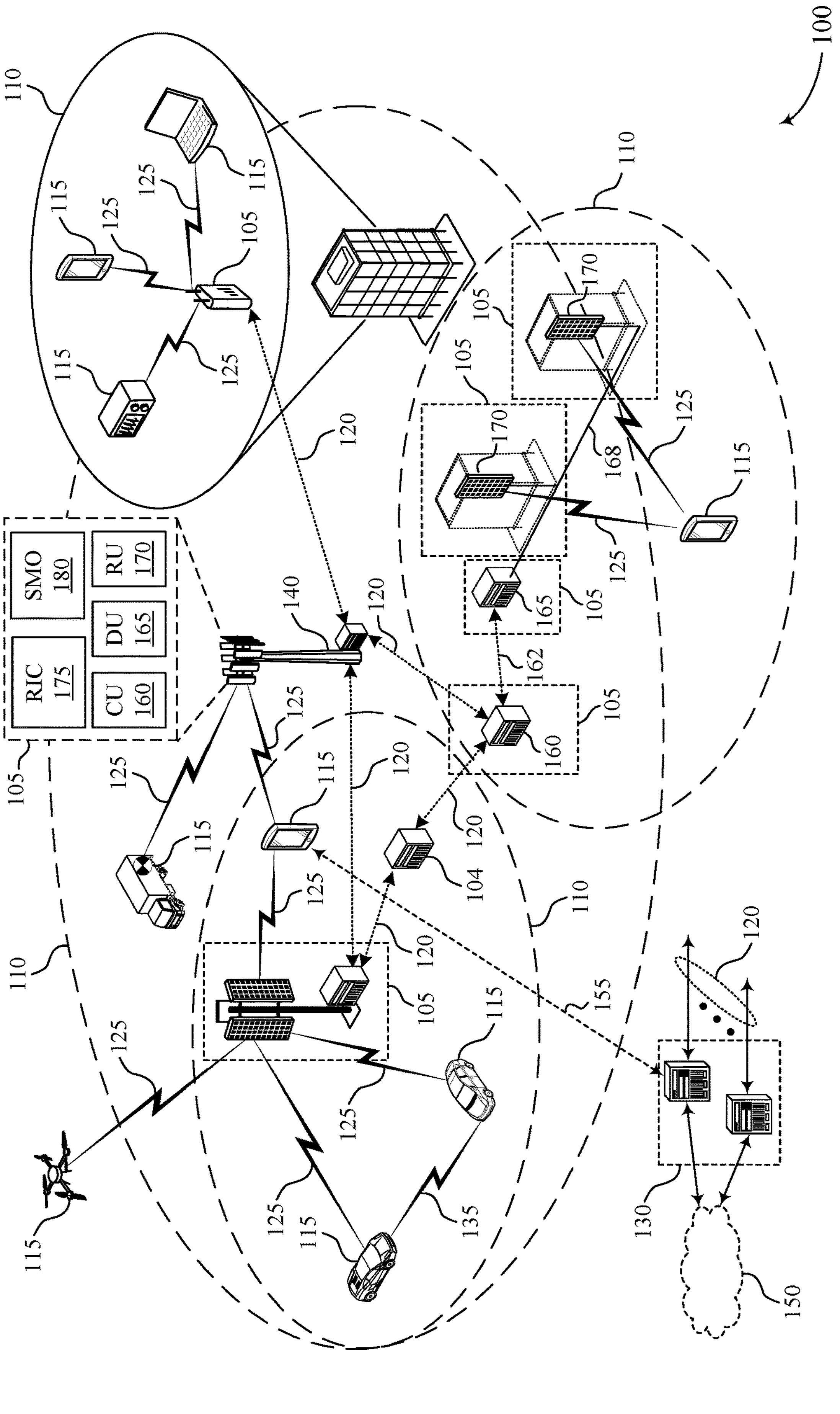
FIG. 1 shows an example of a wireless communications system that supports request based redundancy and early termination for outer coding in accordance with one or more aspects of the present disclosure.

Some network devices may encode packets before transmission to improve reliability of successful reception and decoding of a data set. In some cases, encoded packets may provide redundancy, which may be used to correct errors that result from a transmission environment (e.g., path loss, obstacles). For example, outer coding (e.g., rapid tornado (Raptor) Q (RaptorQ) codes) performed at a Packet Data Convergence Protocol (PDCP) layer, or a radio link control (RLC) layer, may involve sending one or more source symbols and one or more parity symbols. In some cases, a network entity (e.g., a base station) may transmit an outer encoded message including parity symbols to a UE based on estimating channel state information (CSI) or other parameters related to the UE. However, estimating UE-related CSI at a network entity may be less efficient than if calculated at the UE itself, while also requiring higher complexity and overhead at the network entity. Further, a UE may be able to successfully decode data before receiving a full set of parity symbols, or may have a relatively high probability of successfully decoding a data set with only a subset of the parity symbols, and thus one or more resources may be wasted on transmitting the full set of parity symbols.

Techniques described herein enable UE-based requests for outer coding redundancy and early termination of outer coding redundancy transmission to improve resource utilization in a network. For example, a UE may transmit a message requesting redundancy for a set of source symbols of a transmission, and may receive one or more source symbols and one or more parity symbols in response, which may reduce a complexity of calculations at the network entity related to determining whether to use redundancy or not. If the UE successfully decodes a message while one or more of the full set of requested redundancy symbols (or any retransmissions) are still being transmitted, or if the UE receives a quantity of symbols indicating a probability of successful decoding above a threshold, the UE may send feedback requesting early termination of redundant transmissions to free up resources in the network for use by other devices. In some cases, an amount of redundancy (e.g., a percentage of source symbols for which to transmit redundant parity symbols) may be requested by the UE based on historical data, predicted traffic characteristics, as well as CSI at the UE. Further, the request for early termination may be sent after expiration of a timer or after a time window following successful decoding or reception of one or more symbols in case the network entity determines to terminate redundancy transmissions first. The UE may also retransmit the request for early termination if the UE continues to receive parity symbols or retransmissions after a time window or expiration of a timer following the first request for early termination, or based on feedback the UE may request from the network entity.

Aspects of the disclosure are initially described in the context of wireless communications systems. Aspects of the disclosure are further illustrated by and described with reference to wireless communications systems and process flows that relate to request based redundancy and early termination for outer coding. Aspects of the disclosure are further illustrated by and described with reference to apparatus diagrams, system diagrams, and flowcharts that relate to request based redundancy and early termination for outer coding.

FIG. 1 shows an example of a wireless communications system 100 that supports request based redundancy and early termination for outer coding in accordance with one or more aspects of the present disclosure. The wireless communications system 100 may include one or more devices, such as one or more network devices (e.g., network entities 105), one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via communication link(s) 125 (e.g., a radio frequency (RF) access link). For example, a network entity 105 may support a coverage area 110 (e.g., a geographic coverage area) over which the UEs 115 and the network entity 105 may establish the communication link(s) 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices in the wireless communications system 100 (e.g., other wireless communication devices, including UEs 115 or network entities 105), as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with a core network 130, or with one another, or both. For example, network entities 105 may communicate with the core network 130 via backhaul communication link(s) 120 (e.g., in accordance with an S1, N2, N3, or other interface protocol). In some examples, network entities 105 may communicate with one another via backhaul communication link(s) 120 (e.g., in accordance with an X2, Xn, or other interface protocol) either directly (e.g., directly between network entities 105) or indirectly (e.g., via the core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication link(s) 120, midhaul communication links 162, or fronthaul communication links 168 may be or include one or more wired links (e.g., an electrical link, an optical fiber link) or one or more wireless links (e.g., a radio link, a wireless optical link), among other examples or various combinations thereof. A UE 115 may communicate with the core network 130 via a communication link 155.

One or more of the network entities 105 or network equipment described herein may include or may be referred to as a base station 140 (e.g., a base transceiver station, a radio base station, an NR base station, an access point, a radio transceiver, a NodeB, an eNodeB (eNB), a next-generation NodeB or giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within one network entity (e.g., a network entity 105 or a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among multiple network entities (e.g., network entities 105), such as an integrated access and backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU), such as a CU 160, a distributed unit (DU), such as a DU 165, a radio unit (RU), such as an RU 170, a RAN Intelligent Controller (RIC), such as an RIC 175 (e.g., a Near-Real Time RIC (Near-RT RIC), a Non-Real Time RIC (Non-RT RIC)), a Service Management and Orchestration (SMO) system, such as an SMO system 180, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more of the network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, or any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaptation protocol (SDAP), PDCP). The CU 160 (e.g., one or more CUs) may be connected to a DU 165 (e.g., one or more DUs) or an RU 170 (e.g., one or more RUs), or some combination thereof, and the DUs 165, RUs 170, or both may host lower protocol layers, such as layer 1 (L1) (e.g., physical (PHY) layer) or L2 (e.g., RLC layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or multiple different RUs, such as an RU 170). In some cases, a functional split between a CU 160 and a DU 165 or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to a DU 165 via a midhaul communication link 162 (e.g., F1, F1-c, F1-u), and a DU 165 may be connected to an RU 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities (e.g., one or more of the network entities 105) that are in communication via such communication links.

In some wireless communications systems (e.g., the wireless communications system 100), infrastructure and spectral resources for radio access may support wireless backhaul link capabilities to supplement wired backhaul connections, providing an IAB network architecture (e.g., to a core network 130). In some cases, in an IAB network, one or more of the network entities 105 (e.g., network entities 105 or IAB node(s) 104) may be partially controlled by each other. The IAB node(s) 104 may be referred to as a donor entity or an IAB donor. A DU 165 or an RU 170 may be partially controlled by a CU 160 associated with a network entity 105 or base station 140 (such as a donor network entity or a donor base station). The one or more donor entities (e.g., IAB donors) may be in communication with one or more additional devices (e.g., IAB node(s) 104) via supported access and backhaul links (e.g., backhaul communication link(s) 120). IAB node(s) 104 may include an IAB mobile termination (IAB-MT) controlled (e.g., scheduled) by one or more DUs (e.g., DUs 165) of a coupled IAB donor. An IAB-MT may be equipped with an independent set of antennas for relay of communications with UEs 115 or may share the same antennas (e.g., of an RU 170) of IAB node(s) 104 used for access via the DU 165 of the IAB node(s) 104 (e.g., referred to as virtual IAB-MT (vIAB-MT)). In some examples, the IAB node(s) 104 may include one or more DUs (e.g., DUs 165) that support communication links with additional entities (e.g., IAB node(s) 104, UEs 115) within the relay chain or configuration of the access network (e.g., downstream). In such cases, one or more components of the disaggregated RAN architecture (e.g., the IAB node(s) 104 or components of the IAB node(s) 104) may be configured to operate according to the techniques described herein.

In the case of the techniques described herein applied in the context of a disaggregated RAN architecture, one or more components of the disaggregated RAN architecture may be configured to support test as described herein. For example, some operations described as being performed by a UE 115 or a network entity 105 (e.g., a base station 140) may additionally, or alternatively, be performed by one or more components of the disaggregated RAN architecture (e.g., components such as an IAB node, a DU 165, a CU 160, an RU 170, an RIC 175, an SMO system 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or meters, among other examples.

The UEs 115 described herein may be able to communicate with various types of devices, such as UEs 115 that may sometimes operate as relays, as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via the communication link(s) 125 (e.g., one or more access links) using resources associated with one or more carriers. The term "carrier" may refer to a set of RF spectrum resources having a defined PHY layer structure for supporting the communication link(s) 125. For example, a carrier used for the communication link(s) 125 may include a portion of an RF spectrum band (e.g., a bandwidth part (BWP)) that is operated according to one or more PHY layer channels for a given RAT (e.g., LTE, LTE-A, LTE-A Pro, NR). Each PHY layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities, such as one or more of the network entities 105).

In some examples, such as in a carrier aggregation configuration, a carrier may have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different RAT).

The communication link(s) 125 of the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular RAT (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems, such as the wireless communications system 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to UEs 115 (e.g., one or more UEs) or may include UE-specific search space sets for sending control information to a UE 115 (e.g., a specific UE).

In some examples, a network entity 105 (e.g., a base station 140, an RU 170) may be movable and therefore provide communication coverage for a moving coverage area, such as the coverage area 110. In some examples, coverage areas 110 (e.g., different coverage areas) associated with different technologies may overlap, but the coverage areas 110 (e.g., different coverage areas) may be supported by the same network entity (e.g., a network entity 105). In some other examples, overlapping coverage areas, such as a coverage area 110, associated with different technologies may be supported by different network entities (e.g., the network entities 105). The wireless communications system 100 may include, for example, a heterogeneous network in which different types of the network entities 105 support communications for coverage areas 110 (e.g., different coverage areas) using the same or different RATs.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 may include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs (e.g., one or more of the UEs 115) via a device-to-device (D2D) communication link, such as a D2D communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to one or more of the UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than one hundred kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) RAT, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., the communication link(s) 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in relatively poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, the wireless communications system may support UE-based requests for outer coding and early termination of outer coding redundancy transmission to improve resource utilization. For example, a UE 115 may transmit a message requesting redundancy for a set of one or more source symbols of a transmission, and may receive one or more source symbols and one or more parity symbols in response form a network entity 105. If the UE 115 successfully decodes one or more source symbols while one or more of the full set of requested redundancy symbols (or any retransmissions) are still being transmitted, or if the UE 115 receives a quantity of symbols indicating a probability of successful decoding above a threshold, the UE 115 may send feedback requesting early termination of redundant transmissions to free up resources.

Figure 2:
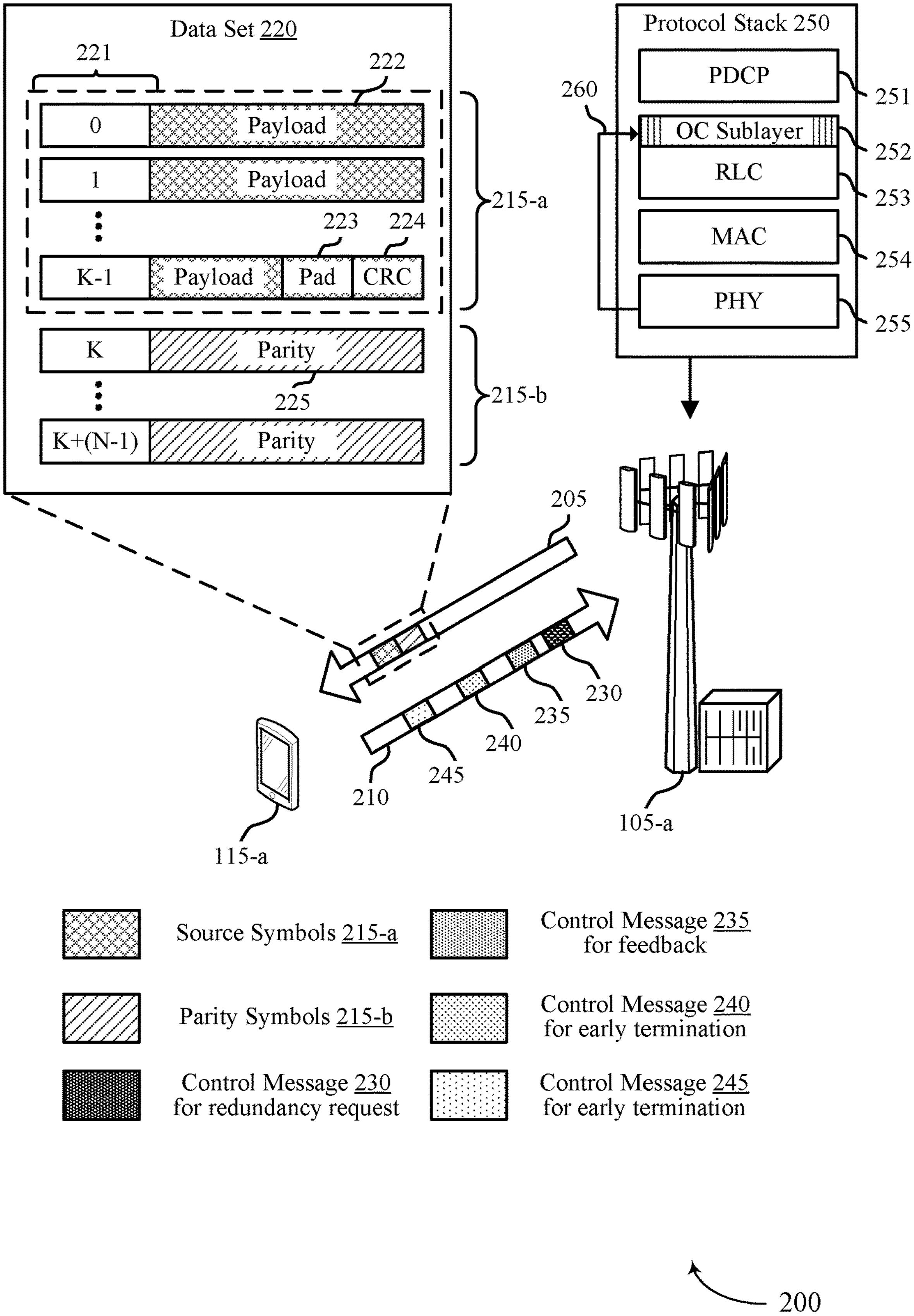
FIG. 2 shows an example of a wireless communications system that supports request based redundancy and early termination for outer coding in accordance with one or more aspects of the present disclosure.

FIG. 2 shows an example of a wireless communications system 200 that supports request based redundancy and early termination for outer coding in accordance with one or more aspects of the present disclosure. In some examples, the wireless communications system 200 may implement or be implemented by aspects of the wireless communications system 100. For example, the wireless communications system 200 may include a network entity 105-*a* that may be in communication with one or more UEs 115, including a UE 115-*a*. The UE 115-*a* may include a downlink communication link 205 and an uplink communication link 210 with the network entity 105-*a*. In some cases, the UE 115-*a* and the network entity 105-*a* may enable outer coding related messaging to decrease a complexity at the network entity 105 as well as to free up resources for one or more other devices.

In some examples, the wireless communications system 200 may support messaging for extended reality (XR) applications (e.g., virtual reality (VR), augmented reality (AR), mixed reality (MR)). For example, the UE 115-*a* may receive XR traffic from the network entity 105-*a*. In some cases, XR traffic characteristics may include relatively high data rates as well as stringent latency bounds and reliability constraints, such as a CloudXR data rate (e.g., 50 Megabits per second (Mbps) at 90 frames per second (fps) for Video, 1 Mbps for Audio, and a round trip time (RTT) of 15 milliseconds (ms) on average, or 22 ms at the 99th percentile). In some examples, outer coding, or network coding, in a RAN protocol stack may provide performance benefits over other existing schemes, such as baseline HARQ. For example, retransmission (e.g., in response to HARQ feedback) and lower modulation and coding (MCS) schemes may suffer in efficiency, as retransmissions may increase a latency of XR traffic bursts and prevent a UE from entering a sleep mode (e.g., sleep state) early. Lower MCSs may also result in higher latency and lower capacity than FEC.

In an example, after receiving XR traffic, the UE 115-*a* may experience an error in a transport block (e.g., failure in receiving or decoding), and may transmit a NACK in response. The UE 115-*a* may consequently experience a delay until being able to receive a retransmission and begin receiving XR traffic again, which may increase a latency of XR traffic bursts while reducing an efficiency in communications. In contrast, outer coding may generate one or more parity symbols from one or more source symbols (e.g., via RaptorQ code, via RS code). For example, the network entity 105-*a* may send extra parity symbols to UE 115-*a* without waiting the retransmission turn-around time and UE 115-*a* may finish the transmission earlier, which may save latency and power consumption. Thus, outer coding may improve a latency and power consumption in the wireless communication system 200 compared to HARQ-ACK feedback processes, and may result in performance gains, e.g., for XR traffic.

In some examples, the network may include a layer for outer coding within a network protocol stack 250, or network coding, such as an outer coding sublayer 252 (e.g., OC sublayer) between a PDCP layer 251 and an RLC layer 253. The network protocol stack 250 may also include a MAC layer 254 and a PHY layer 255. In split architecture deployments where a split may be between the PDCP layer 251 and the RLC layer 253, the outer coding sublayer 252 may be in a CU 160 together with PDCP (e.g., below PDCP, for example, in the network protocol stack 250), or may be in a DU 165 together with RLC (e.g., above RLC, for example, in the network protocol stack 250). In some examples, a consideration (e.g., with RLC) may be to reuse the natural segmentation functionality of the RLC layer 253 to allow segmented PDCP packet data units (PDUs) and to extend to have segmentation of outer coding symbols as well. The PDCP packets belonging to a PDU set may also be identified as an outer coding block in the outer coding sublayer 252. In some cases, a network may obtain its own feedback 260 for outer coding (e.g., PHY-feedback, OC-PHY feedback) on outer coding symbol size (e.g., how many outer coding symbols MAC and PHY delivered, along with how many parity symbols are included to adapt for outer coding redundancy determination at the network). Redundancy of outer codes may in some cases vary in time based on PHY-feedback.

In outer coding, or network coding, redundant packets, or parity symbols, may be sent together with original packets, or source symbols, to increase reliability. For example, outer coding may involve FEC, where the network entity 105-*a* may transmit a set of multiple symbols 215, including one or more parity symbols 215-*b* generated using source symbols 215-*a* of a data set 220 (e.g., a PDU set). In some cases, the data set 220 may indicate a message according to different outer codes (e.g., rapid tornado (Raptor) Q codes, Reed-Solomon (RS) codes). The network entity 105-*a* may transmit the parity symbols 215-*b* along with (e.g., following) the source symbols 215-*a* (e.g., of one or more original packets) to provide redundancy (e.g., incremental redundancy) in transmission and to allow the UE 115-*a* to recover a full message even if one or more source symbols 215-*b* are missed or unsuccessfully decoded. Redundancy overhead may in some cases be related to each UE's channel quality, including CSI, drop rate, latency, etc. In some cases, based on a recovery probability of RaptorQ code, if a quantity of received symbols is equal or larger than a quantity of source symbols 215-*b*, a recovery probability may be relatively high (e.g., >99%).

For example, the symbols 215 via which the data set 220 is transmitted may be encoded according to a RaptorQ code (e.g., an application-level FEC), where a Raptor code structure may be represented as illustrated in FIG. 2. For example, each symbol 215 may include a symbol index within a header 221. There may be a total of K source symbols 215-*a* (e.g., systematic) ranging from a symbol index 0 to an index K−1, where each source symbol 215-*a* may include a payload 222. In some cases, a last symbol 215-*a* corresponding to an index K−1 may also include one or more padding bits 223 (e.g., Padding 0) and one or more tail bits 224 (e.g., 4 bytes, 32-bit cyclic redundancy check (CRC)). In some cases, the source symbols 215 may represent a source block. There may also be a total of N parity symbols 215-*b* that may follow the source symbols 215-*a* (e.g., a tail of parity symbols). The parity symbols 215-*b* may range from a symbol index of K to K+(N−1), where each parity symbol 215-*b* may include parity information 225, and may correspond to and provide redundancy for a source symbol 215-*a*. The one or more symbols 215-*b* may also be part of a block including the source block and the one or more symbols 215-*b*.

In some examples, the network entity 105-*a* may estimate one or more parameters related to the UE 115-*a* (e.g., CSI) and may determine the quantity N of parity symbols 215-*b* to transmit in the data set 220 for the corresponding quantity K of source symbols 215-*a*. For example, N may correspond to a percentage of K to provide a respective redundancy appropriate for a corresponding channel quality for the data set 220. However, estimation of UE-related CSI at the network entity 105-*a* may be less efficient than if calculated at the UE 115-*a* itself, and may add increased complexity and overhead at the network entity 105-*a*.

Further, in decoding a RaptorQ encoded message, a recovery probability of a RaptorQ code may be based on a quantity of received symbols M received by the UE 115-*a* and the quantity K of source symbols 215-*a*, which may be represented by Equation 1 below:

$$\text{Recovery Probability} = \begin{cases} 0, M < K \\ 1 - \frac{1}{256^{M-K+1}}, M \geq K \end{cases} \quad (1)$$

As illustrated in Equation 1, when M<K, recovery may not be possible. However, when the UE 115-*a* receives K or more symbols, the recovery probability may be greater than 99%. Thus, the UE 115-*a* may begin to perform outer code decoding with receiving K symbols, or more than K symbols, (e.g., including K source symbols, or M as greater than or equal to K symbols including both source symbols and parity symbols) where K may be equal to the quantity of the source symbols 215-*a* and may be based on UE implementation. Additionally, or alternatively, if the UE 115-*a* uses a higher recovery probability, the UE 115-*a* may wait to receive more than K symbols to start outer code decoding at the outer coding sublayer 252. Notably, as the UE 115-*a* may have a high probability to successfully decode the data set 220 to obtain a message even without receiving the full set of symbols 215-*a* and parity symbols 215-*b*, one or more resources used to transmit a remainder of the parity symbols 215-*b* after the data set 220 is decoded may be wasted as the UE 115-*a* may not use the rest of the parity symbols.

As described herein, the UE 115-*a* may request redundancy for outer coding from the network entity 105-*a* (e.g., based on an artificial intelligence (AI)/machine learning (ML) model of the UE 115-*a*). For example, the UE 115-*a* may transmit a control message 230 to the network entity 105-*a* that may include a request for outer coding of source symbols of the data set 220. In some examples, the requested redundancy may indicate how many parity symbols per data set 220 of source symbols (e.g., per each PDU set) for outer coding. For example, the control message may indicate a requested quantity N of parity symbols 215-*b*, where N is an integer. Requested redundancy (e.g., requested quantity N of parity symbols 215-*b*) may in some cases be related to a specific channel quality of each UE 115 of the wireless communications system 200, such as CSI, drop rate, latency, etc. Redundancy may also be related to each data flow of a UE 115. Additionally, or alternatively, the UE 115-*a* may determine the quantity N based on using one or more AI models or ML models at the UE 115-*a*. For example, with an AI or ML model (e.g., with historic model over last N seconds, with a prediction of future traffic model, a blockage model, a hand-over prediction, or based on a combination of historic data and future data of the AI/ML model) the UE 115-*a* may request to adjust redundancy for outer coding to improve reliability based on channel quality.

In some examples, the request (e.g., the control message 230) may be aperiodic or periodic. Additionally, or alternatively, the request may be sent at one time or may be sent in accordance with a pattern for a time window, where the pattern indicates when to send the request. In some cases, the request may indicate a single value (e.g., to reduce or increase a level of redundancy to X %, where X % corresponds to a proportion of a quantity of parity symbols relative to a number of source symbols included in a data set). Additionally, or alternatively, the request may indicate multiple values. For example, the request may indicate a time window for which a first quantity of time (e.g., in ms) may include an X % redundancy time (e.g., X % corresponds to a proportion of a quantity of parity symbols relative to a number of source symbols included in a first data set sent during the first quantity of time) and after may include a Y % redundancy for a second quantity of time (e.g., Y % corresponds to a proportion of a quantity of parity symbols relative to a number of source symbols included in a second data set send during a second quantity of time). In some examples, to indicate the multiple values, the control message 230 may indicate a quantity of time, a quantity of slots, one or more symbol periods, or one or more time windows of a total time window that may correspond to each of the multiple indicated redundancy values. In some examples, a UE request may be more accurate than gNB estimated UE redundancy (e.g., estimated by the network entity 105-*a*) for outer coding, for example, as the UE may have access to more information and include the AI or ML model. In some examples, UE request signaling may be sent via uplink control information (UCI), MAC control element (MAC-CE), RRC (e.g., at one time), where the control message 230 may be any of a UCI, MAC-CE, or RRC. Further, requests may be transmitted via HARQ or RLC feedback as well.

Additionally, or alternatively, a network may increase an efficiency in resource usage by enabling early termination of outer coding redundancy transmissions. In some examples, a network entity (e.g., the network entity 105-*a*, a gNB) may count a quantity of received feedback information (e.g., ACK info) that may represent successfully delivered (or successfully decoded) packets or source symbols (e.g., received or decode at the UE 115-*a*). Once K or more symbols are counted, the network entity may stop (e.g., terminate) parity symbol transmission in a current data set as well as retransmissions of the data set. For example, the UE 115-*a* may transmit feedback via one or more control messages 235 indicating HARQ-ACK/NACK feedback to the network entity 105-*a*, and once K symbols of a data set have been successfully delivered to the UE 115-*a*, the network entity 105-*a* may terminate transmission of a remainder of the parity symbols 215-*a* for that data set.

In some examples, a UE may request early termination of outer coding redundancy transmissions from a serving network entity (e.g., gNB). For example, once the UE 115-*a* successfully receives or successfully decodes up to K or more than K source symbols (or K symbols including both source symbols and parity symbols if one or more source symbols are lost) of the data set 220 (e.g., PDU set), the UE 115-*a* may transmit a control message 240 including a request to terminate parity symbol transmissions for a remainder of parity symbols 215-*b* in that data set 220. In some cases, a time window before the UE 115-*a* sends a request for early termination may be defined, where the time window may correspond to a quantity of slots, a quantity of symbol periods, or a quantity of time (e.g., ms). For example, the UE 115-*a* may be configured with the time window (e.g., via prior RRC signaling) and may transmit the control message 240 requesting termination of parity symbol transmissions subsequent to expiration of the time window, where the time window may begin after K symbols of the data set 220 are successfully decoded. Additionally, or alternatively, to a request, the control message 240 may include feedback that may indicate or be used to determine to perform early termination of the parity symbol 215-*b* transmissions. In some examples, the UE 115-*a* may transmit the control message 240 in addition to, or alternate to, transmitting the control message 230 requesting redundancy in outer coding transmissions. The UE 115-*a* may also transmit any combination of the control messages 230, 235, and 240, among additional control messaging.

In some cases, the time window may be utilized to determine if a network entity is able to determine by itself if early termination is to be performed based on HARQ-ACK/NACK or RLC feedback (e.g., by counting received ACK information that represents successfully delivered or decoded packets or source symbols). For example, the network entity 105-*a* may determine to execute early termination before the end of the time period and may terminate the transmission of a remainder of the parity symbols 215-*a*, and the UE 115-*a* may be made aware of this due to the lack of received parity symbols 215-*b*. Thus, the UE may refrain from sending the control message 240 as the UE assume that the network entity 105-*a* has performed early termination of the parity symbols 215-*b* of the data set 220, which may reduce an overhead in communications as well as resources and power usage at the UE 115-*a*. Alternatively, if the network entity 105-*a* does determine to terminate the transmission of the remainder (e.g., rest) of the parity symbols 215-*b* of the data set 220 within the time period, the UE 115-*a* may transmit the control message 240 (e.g., to indicate to no longer transmit or retransmit the parity symbols 215-*b* of the data set 220).

Additionally, or alternatively, a timer may be defined, where the timer may be started when a UE successfully receives or decodes K or more than K symbols of a data set (e.g., PDU set). For example, the UE 115-*a* may begin a timer after successfully receiving or decoding the K symbols of the data set 220 (e.g., PDU set), where if the network entity 105-*a* performs early termination while the timer is running, the timer may be stopped and reset, and the UE 115-*a* may refrain from transmitting the control message 240. Otherwise, if the timer expires without the network entity 105-*a* applying early termination, the timer may be stopped and reset and the UE 115-*a* may transmit the control message 240 (e.g., feedback) to request or indicate early termination.

In some examples, transmitting UE based requests for early termination of redundant transmissions may be more accurate compared to a network entity performing early termination itself. Notably, RaptorQ codes may not guarantee a 100% recovery rate (e.g., at K, or more than K, symbols), and so UE feedback may be more accurate. For example, is ACK/NACK feedback indicated to the network entity 105-*a* via the control message 235 indicates successful delivery, but not successful decoding, or one or more symbols, then the network entity 105-*a* may be unable to determine if the UE 115-*a* has successfully decoded a message. Further, even if a network entity may estimate if a UE may decode one or more symbols or not based on counting a quantity of successfully received symbols (e.g., for the outer coding sublayer 252), doing so at a network entity may increase complexity in network entity implementation. Thus, if may be beneficial to reduce network entity (e.g., gNB) complexity with UE feedback based early termination for outer coding. Further, UE feedback based early termination may reduce resource utilization for a system by freeing resources for use by other devices.

In some examples, a UE may perform retransmissions associated with a request or indication for early termination. For example, UE feedback signaling (e.g., via the control message 240) may have a probability to be lost (or altered) if a feedback channel is noisy. Thus, a UE may send second (or additional) feedback to a network entity (e.g., gNB) if the UE continues to receive parity symbols after a time window (e.g., T ms or M slots) or a timer counting from sending the first feedback signaling (e.g., if UE needs faster timeline than HARQ timeline of MAC-CE). For example, after a second timer window or timer started after transmitting the control message 240, the UE 15-*a* may transmit second feedback via a control message 245 to the network entity 105-*a*. In some examples, retransmitting feedback may be useful for relatively larger redundancy probability including a long tail of parity symbols (e.g., as a UE may still be receiving parity symbols after the second time window or timer).

Additionally, or alternatively, ACK/NACK for UCI may be configured for reliability. For example, the UE 115-*a* may transmit a request for feedback to the network entity 105-*a* to indicate whether or not the first feedback in the control message 240 is successfully received or decoded by the network entity 105-*a*, where the network entity 105-*a* may transmit feedback in response. If the UE 115-*a* receives a NACK, the UE 115-*a* may transmit the second feedback via the control message 245.

In some examples, UE feedback signaling (e.g., via the control message 240 or 245 or one or more control messages 235), which may be an outer coding sublayer status report (e.g., a network coding sublayer status report), may be transmitted via UCI or MAC-CE to indicate to a network entity to terminate parity symbols and retransmissions of a data set 220. In some examples, this may allow related packets to be discarded at the outer coding sublayer 252 or the MAC layer 254 as an early termination to free the resources for other UEs and data. Additionally, or alternatively, in some examples, a UE may indicate with 1-bit whether or not the UE successfully decoded a data set (e.g., PDU set) in the outer coding sublayer 252 at an outer code decoder (e.g., the data set 220). Further, a UE may indicate an outer coding block index (e.g., 1-bit) which may be used to indicate which outer coding block is successfully decoded at the UE. For example, one or more control messages sent by the UE 115-*a* may include a 1-bit feedback to indicate if the data set 220 is successfully decoded, and a 1-bit outer coding block index to indicate a block of the data set 220. In some examples, an outer coding block may be a PDU set (e.g., multiple PDCP PDU of IP packets) that may represent a video slice, an XR frame, a traffic burst, etc.

Figure 3:
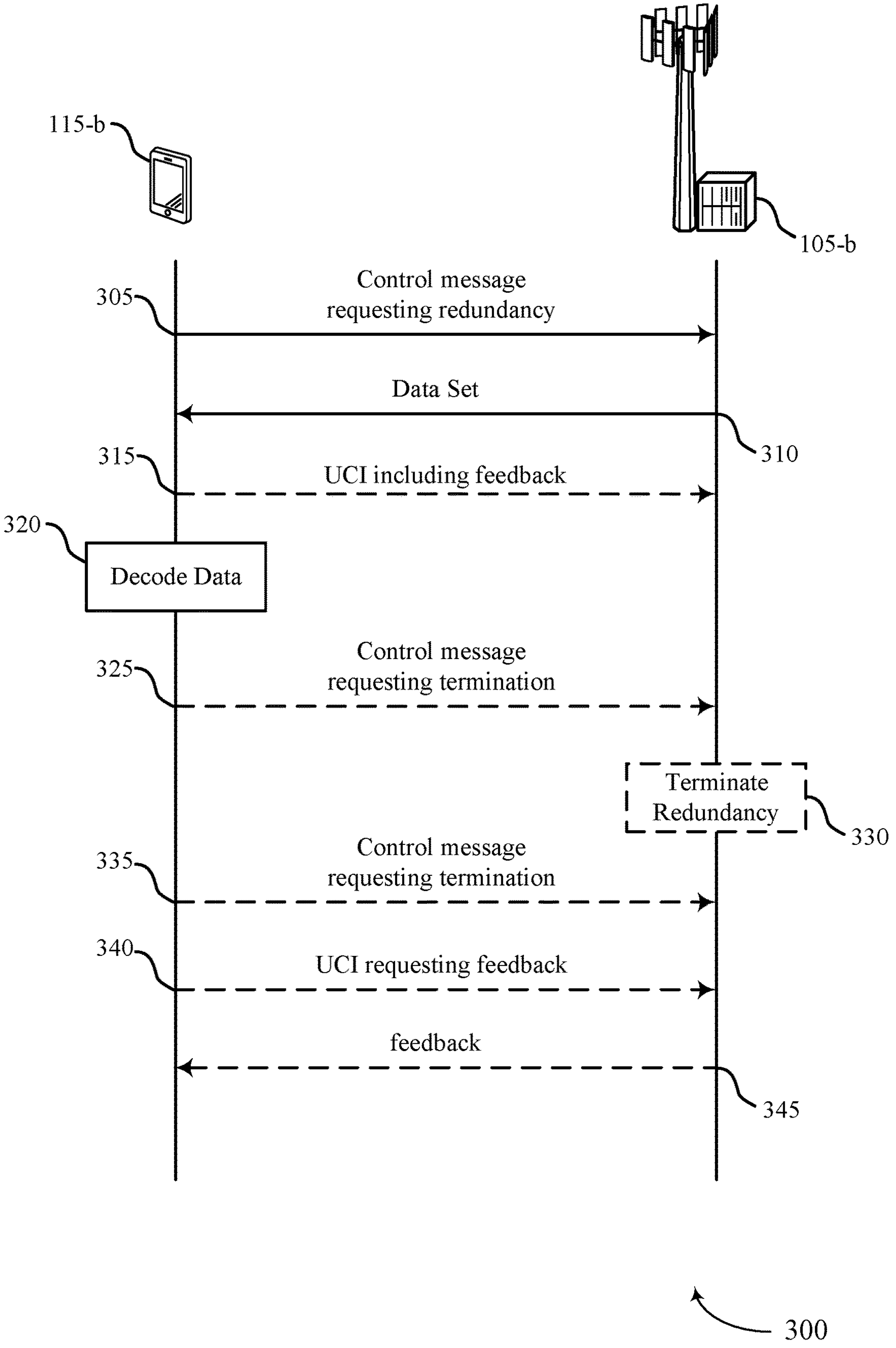
FIG. 3 shows an example of a process flow that supports request based redundancy and early termination for outer coding in accordance with one or more aspects of the present disclosure.

FIG. 3 shows an example of a process flow 300 that supports request based redundancy and early termination for outer coding in accordance with one or more aspects of the present disclosure. In some examples, the process flow 300 may implement or be implemented by aspects of the wireless communications systems 100, the wireless communications system 200, or both. For example, the process flow 300 may include one or more UEs 115, including a UE 115-*b*, and one or more network entities 105, including a network entity 105-*b*, that may support outer coding including redundancy.

In the following description of the process flow 300, the operations may be performed (such as reported or provided) in a different order than the order shown, or the operations performed by the example devices may be performed in different orders or at different times. Some operations also may be omitted from the process flow 300, or other operations may be added to the process flow 300. Further, although some operations or signaling may be shown to occur at different times for discussion purposes, these operations may actually occur at the same time or at least partially concurrently.

At 305, the UE 115-*b* may in some examples transmit, and the network entity 105-*b* may in some examples obtain (e.g., receive directly or indirectly via one or more components or devices), a control message including a request for outer coding of source symbols of a data set and indicating a requested quantity of redundancy parity symbols for the data set. In some examples, the control message may request a first quantity of redundancy parity symbols for a first data set and a second quantity of redundancy parity symbols for a second data set. Additionally, or alternatively, the control message may be UCI, a MAC-CE, or an RRC message. The control message may also be an aperiodic control message or one of a set of multiple control messages that are periodically transmitted.

In some examples, the control message may request a first quantity of redundancy parity symbols for one or more data sets communicated during a first time window and a second quantity of redundancy parity symbols for one or more data sets communicated during a second time window. The requested quantity of redundancy parity symbols may be determined by an ML model based on historical data, a predicted traffic level, blockage data, a handover prediction, or any combination thereof. Further, the requested quantity of redundancy parity symbols may be based on channel quality, CSI, latency, a drop rate, or any combination thereof.

At 310, the UE 115-*b* may receive, and the network entity 105-*b* may output (e.g., transmit directly or indirectly via one or more components or devices), via a set of multiple symbols, the first data set comprising outer-encoded data. In some examples, the set of multiple symbols may include a set of multiple source symbols and one or more redundancy parity symbols. In some cases, the set of multiple source symbols and one or more redundancy parity symbols may correspond to the requested quantity of redundancy parity symbols.

At 315, the UE 115-*b* may optionally transmit, and the network entity 105-*b* may optionally obtain, UCI including feedback associated with decoding of at least a defined quantity of the set of multiple symbols of the first data set.

At 320, the UE 115-*b* may decode the outer-encoded data received via the set of multiple source symbols and at least one of the one or more redundancy parity symbols to obtain a message.

At 325, the UE 115-*b* may optionally transmit, and the network entity 105-*b* may optionally obtain, a second control message requesting termination of transmission of one or more subsequent redundant parity symbols of the first data set. In some examples, the UE 115-*b* may transmit the second control message based on successful decoding of the outer-encoded data to obtain the message. Additionally, or alternatively, the UE 115-*b* may transmit the second control message based on successful decoding of at least a defined quantity of the set of multiple symbols of the first data set (e.g., K symbols including one or more source symbols, one or more redundant parity symbols, or both). In some cases, the second control message may be transmitted subsequent to a time window elapsing after successful decoding of at least the defined quantity of the set of multiple symbols of the first data set. The time window corresponding to a quantity of slots, a quantity of symbol periods, or a quantity of time. The UE 115-*b* may also transmit the second control message based on an expiration of a timer after successful decoding of at least the defined quantity of the set of multiple symbols of the first data set.

At 330, the network entity 105-*b* may terminate transmission of one or more subsequent redundant parity symbols of the first data set. In some examples, the termination may be based on a quantity of successfully received symbols indicated by the feedback at 315 satisfying a threshold quantity of received symbols, or may be based on a quantity of estimated successfully decoded symbols satisfying a threshold quantity of decoded symbols. Further, the termination may be based on the second control message requesting termination, for example, if sent at 325.

At 335, the UE 115-*b* may optionally transmit a third control message requesting termination of transmission of the one or more subsequent redundant parity symbols of the first data set based on a time duration elapsing or expiration of a timer following transmission of the second control message.

At 340, the UE 115-*b* may optionally transmit, and the network entity 105-*b* may optionally obtain, UCI requesting feedback for the third control message. Additionally, or alternatively, the UE 115-*b* may transmit a UCI requesting feedback for the second control message (e.g., at an earlier time).

At 345, the network entity 105-*b* may optionally output a feedback message indicating whether the third control message was successfully received. The network entity 105-*b* may also output a feedback message indicating whether the second control message was successfully received (e.g., at an earlier time).

Figure 4:
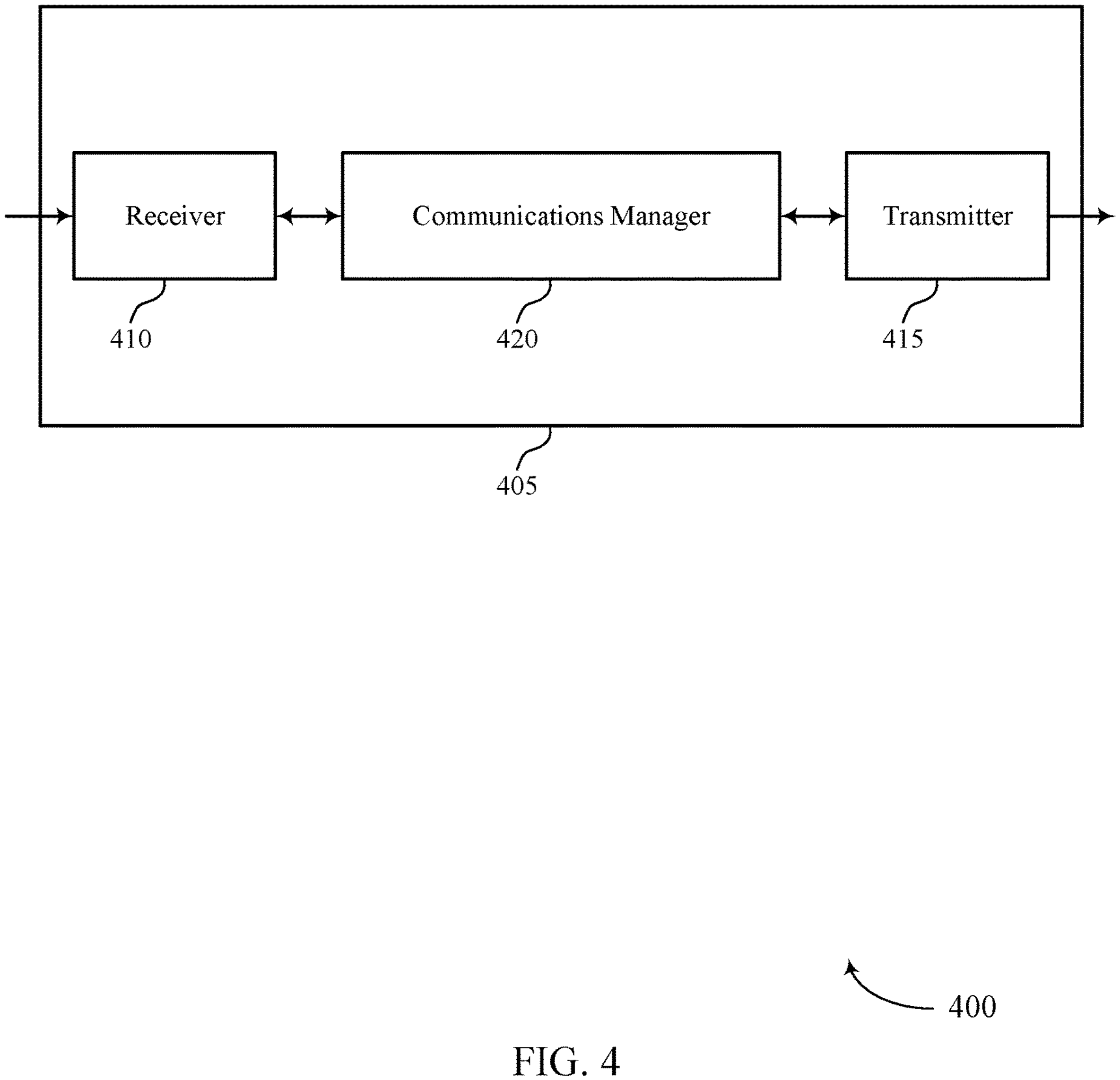
FIGS. 4 and 5 show block diagrams of devices that support request based redundancy and early termination for outer coding in accordance with one or more aspects of the present disclosure.

FIG. 4 shows a block diagram 400 of a device 405 that supports request based redundancy and early termination for outer coding in accordance with one or more aspects of the present disclosure. The device 405 may be an example of aspects of a UE 115 as described herein. The device 405 may include a receiver 410, a transmitter 415, and a communications manager 420. The device 405, or one or more components of the device 405 (e.g., the receiver 410, the transmitter 415, the communications manager 420), may include at least one processor (not shown), which may be coupled with at least one memory (not shown), to, individually or collectively, support or enable the described techniques. Each of these components may be in communication with one another (e.g., via one or more buses (not shown)).

The receiver 410 may provide a means for receiving information such as packets, user data, control information, or any combination thereof associated with various information channels (e.g., control channels, data channels, information channels related to request based redundancy and early termination for outer coding). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to request based redundancy and early termination for outer coding). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations or components thereof may be examples of means for performing various aspects of request based redundancy and early termination for outer coding as described herein. For example, the communications manager 420, the receiver 410, the transmitter 415, or various combinations or components thereof may be capable of performing one or more of the functions described herein.

In some examples, the communications manager 420, the receiver 410, the transmitter 415, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 420, the receiver 410, the transmitter 415, or various combinations or components thereof may be implemented in code (e.g., as communications management software or firmware) executed by at least one processor (e.g., referred to as a processor-executable code). If implemented in code executed by at least one processor, the functions of the communications manager 420, the receiver 410, the transmitter 415, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 420 may be configured to perform various operations (e.g., receiving, obtaining, monitoring, outputting, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to obtain information, output information, or perform various other operations as described herein.

The communications manager 420 may support wireless communication in accordance with examples as disclosed herein. For example, the communications manager 420 is capable of, configured to, or operable to support a means for transmitting a control message including a request for outer coding of source symbols of a data set and indicating a requested quantity of redundancy parity symbols for the data set. The communications manager 420 is capable of, configured to, or operable to support a means for receiving, via a set of multiple symbols, a first data set including outer-encoded data, the set of multiple symbols including a set of multiple source symbols and one or more redundancy parity symbols that correspond to the requested quantity of redundancy parity symbols. The communications manager 420 is capable of, configured to, or operable to support a means for decoding the outer-encoded data received via the set of multiple source symbols and at least one of the one or more redundancy parity symbols to obtain a message.

Additionally, or alternatively, the communications manager 420 may support wireless communication in accordance with examples as disclosed herein. For example, the communications manager 420 is capable of, configured to, or operable to support a means for receiving, via a set of multiple symbols, a first data set including outer-encoded data, the set of multiple symbols including a set of multiple source symbols and one or more redundancy parity symbols. The communications manager 420 is capable of, configured to, or operable to support a means for decoding the outer-encoded data received via the set of multiple source symbols and at least one of the one or more redundancy parity symbols to obtain a message. The communications manager 420 is capable of, configured to, or operable to support a means for transmitting a control message requesting termination of transmission of one or more subsequent redundant parity symbols of the first data set based on successful decoding of the outer-encoded data to obtain the message.

By including or configuring the communications manager 420 in accordance with examples as described herein, the device 405 (e.g., at least one processor controlling or otherwise coupled with the receiver 410, the transmitter 415, the communications manager 420, or a combination thereof) may support techniques for reduced processing, reduced power consumption, and more efficient utilization of communication resources by enabling UE based requests for outer coding redundancy and early termination for outer coding redundancy transmission.

Figure 5:
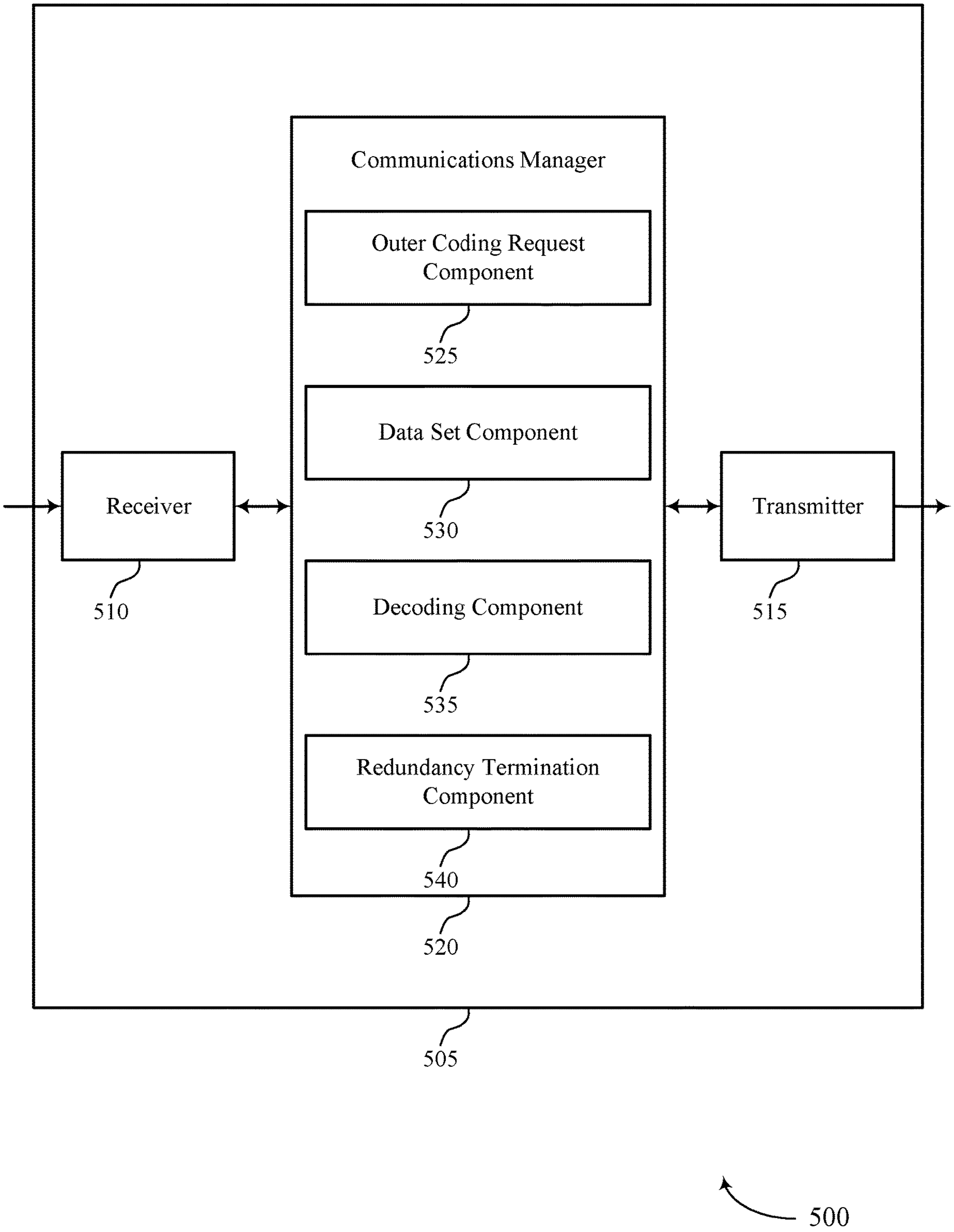

FIG. 5 shows a block diagram 500 of a device 505 that supports request based redundancy and early termination for outer coding in accordance with one or more aspects of the present disclosure. The device 505 may be an example of aspects of a device 405 or a UE 115 as described herein. The device 505 may include a receiver 510, a transmitter 515, and a communications manager 520. The device 505, or one or more components of the device 505 (e.g., the receiver 510, the transmitter 515, the communications manager 520), may include at least one processor (not shown), which may be coupled with at least one memory (not shown), to support the described techniques. Each of these components may be in communication with one another (e.g., via one or more buses (not shown)).

The receiver 510 may provide a means for receiving information such as packets, user data, control information, or any combination thereof associated with various information channels (e.g., control channels, data channels, information channels related to request based redundancy and early termination for outer coding). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to request based redundancy and early termination for outer coding). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of request based redundancy and early termination for outer coding as described herein. For example, the communications manager 520 may include an outer coding request component 525, a data set component 530, a decoding component 535, a redundancy termination component 540, or any combination thereof. The communications manager 520 may be an example of aspects of a communications manager 420 as described herein. In some examples, the communications manager 520, or various components thereof, may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication in accordance with examples as disclosed herein. The outer coding request component 525 is capable of, configured to, or operable to support a means for transmitting a control message including a request for outer coding of source symbols of a data set and indicating a requested quantity of redundancy parity symbols for the data set. The data set component 530 is capable of, configured to, or operable to support a means for receiving, via a set of multiple symbols, a first data set including outer-encoded data, the set of multiple symbols including a set of multiple source symbols and one or more redundancy parity symbols that correspond to the requested quantity of redundancy parity symbols. The decoding component 535 is capable of, configured to, or operable to support a means for decoding the outer-encoded data received via the set of multiple source symbols and at least one of the one or more redundancy parity symbols to obtain a message.

Additionally, or alternatively, the communications manager 520 may support wireless communication in accordance with examples as disclosed herein. The data set component 530 is capable of, configured to, or operable to support a means for receiving, via a set of multiple symbols, a first data set including outer-encoded data, the set of multiple symbols including a set of multiple source symbols and one or more redundancy parity symbols. The decoding component 535 is capable of, configured to, or operable to support a means for decoding the outer-encoded data received via the set of multiple source symbols and at least one of the one or more redundancy parity symbols to obtain a message. The redundancy termination component 540 is capable of, configured to, or operable to support a means for transmitting a control message requesting termination of transmission of one or more subsequent redundant parity symbols of the first data set based on successful decoding of the outer-encoded data to obtain the message.

Figure 6:
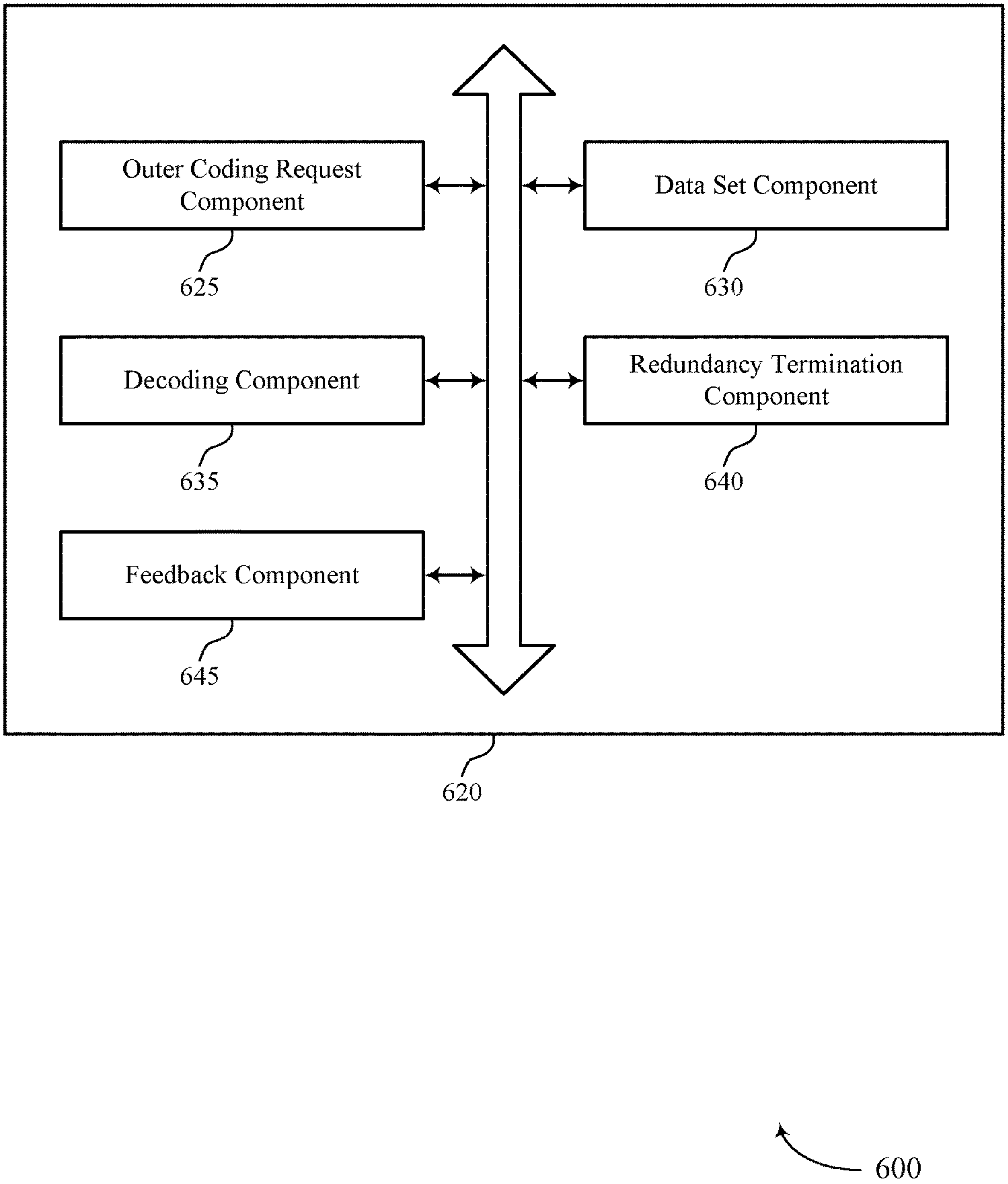
FIG. 6 shows a block diagram of a communications manager that supports request based redundancy and early termination for outer coding in accordance with one or more aspects of the present disclosure.

FIG. 6 shows a block diagram 600 of a communications manager 620 that supports request based redundancy and early termination for outer coding in accordance with one or more aspects of the present disclosure. The communications manager 620 may be an example of aspects of a communications manager 420, a communications manager 520, or both, as described herein. The communications manager 620, or various components thereof, may be an example of means for performing various aspects of request based redundancy and early termination for outer coding as described herein. For example, the communications manager 620 may include an outer coding request component 625, a data set component 630, a decoding component 635, a redundancy termination component 640, a feedback component 645, or any combination thereof. Each of these components, or components or subcomponents thereof (e.g., one or more processors, one or more memories), may communicate, directly or indirectly, with one another (e.g., via one or more buses).

The communications manager 620 may support wireless communication in accordance with examples as disclosed herein. The outer coding request component 625 is capable of, configured to, or operable to support a means for transmitting a control message including a request for outer coding of source symbols of a data set and indicating a requested quantity of redundancy parity symbols for the data set. The data set component 630 is capable of, configured to, or operable to support a means for receiving, via a set of multiple symbols, a first data set including outer-encoded data, the set of multiple symbols including a set of multiple source symbols and one or more redundancy parity symbols that correspond to the requested quantity of redundancy parity symbols. The decoding component 635 is capable of, configured to, or operable to support a means for decoding the outer-encoded data received via the set of multiple source symbols and at least one of the one or more redundancy parity symbols to obtain a message.

In some examples, the redundancy termination component 640 is capable of, configured to, or operable to support a means for transmitting a second control message requesting termination of transmission of one or more subsequent redundant parity symbols of the first data set based on successful decoding of the outer-encoded data to obtain the message.

In some examples, the redundancy termination component 640 is capable of, configured to, or operable to support a means for transmitting a third control message requesting termination of transmission of the one or more subsequent redundant parity symbols of the first data set based on a time duration elapsing or expiration of a timer following transmission of the second control message.

In some examples, the feedback component 645 is capable of, configured to, or operable to support a means for transmitting UCI requesting feedback for the third control message.

In some examples, the redundancy termination component 640 is capable of, configured to, or operable to support a means for transmitting a second control message requesting termination of transmission of one or more subsequent redundant parity symbols of the first data set based on successful decoding of at least a defined quantity of the set of multiple symbols of the first data set.

In some examples, the second control message is transmitted subsequent to a time window elapsing after successful decoding of at least the defined quantity of the set of multiple symbols of the first data set, the time window corresponding to a quantity of slots, a quantity of symbol periods, or a quantity of time.

In some examples, the second control message is transmitted based on an expiration of a timer after successful decoding of at least the defined quantity of the set of multiple symbols of the first data set.

In some examples, the control message requests a first quantity of redundancy parity symbols for one or more data sets communicated during a first time window and a second quantity of redundancy parity symbols for one or more data sets communicated during a second time window.

In some examples, the requested quantity of redundancy parity symbols is determined by a machine learning model based on historical data, a predicted traffic level, blockage data, a handover prediction, or any combination thereof.

In some examples, the requested quantity of redundancy parity symbols is based on channel quality, CSI, latency, a drop rate, or any combination thereof.

In some examples, the control message requests a first quantity of redundancy parity symbols for the first data set and a second quantity of redundancy parity symbols for a second data set.

In some examples, the control message includes UCI, a MAC-CE, or an RRC message.

In some examples, the control message is an aperiodic control message or the control message is one of a set of multiple control messages that are periodically transmitted.

Additionally, or alternatively, the communications manager 620 may support wireless communication in accordance with examples as disclosed herein. In some examples, the data set component 630 is capable of, configured to, or operable to support a means for receiving, via a set of multiple symbols, a first data set including outer-encoded data, the set of multiple symbols including a set of multiple source symbols and one or more redundancy parity symbols. In some examples, the decoding component 635 is capable of, configured to, or operable to support a means for decoding the outer-encoded data received via the set of multiple source symbols and at least one of the one or more redundancy parity symbols to obtain a message. The redundancy termination component 640 is capable of, configured to, or operable to support a means for transmitting a control message requesting termination of transmission of one or more subsequent redundant parity symbols of the first data set based on successful decoding of the outer-encoded data to obtain the message.

Figure 7:
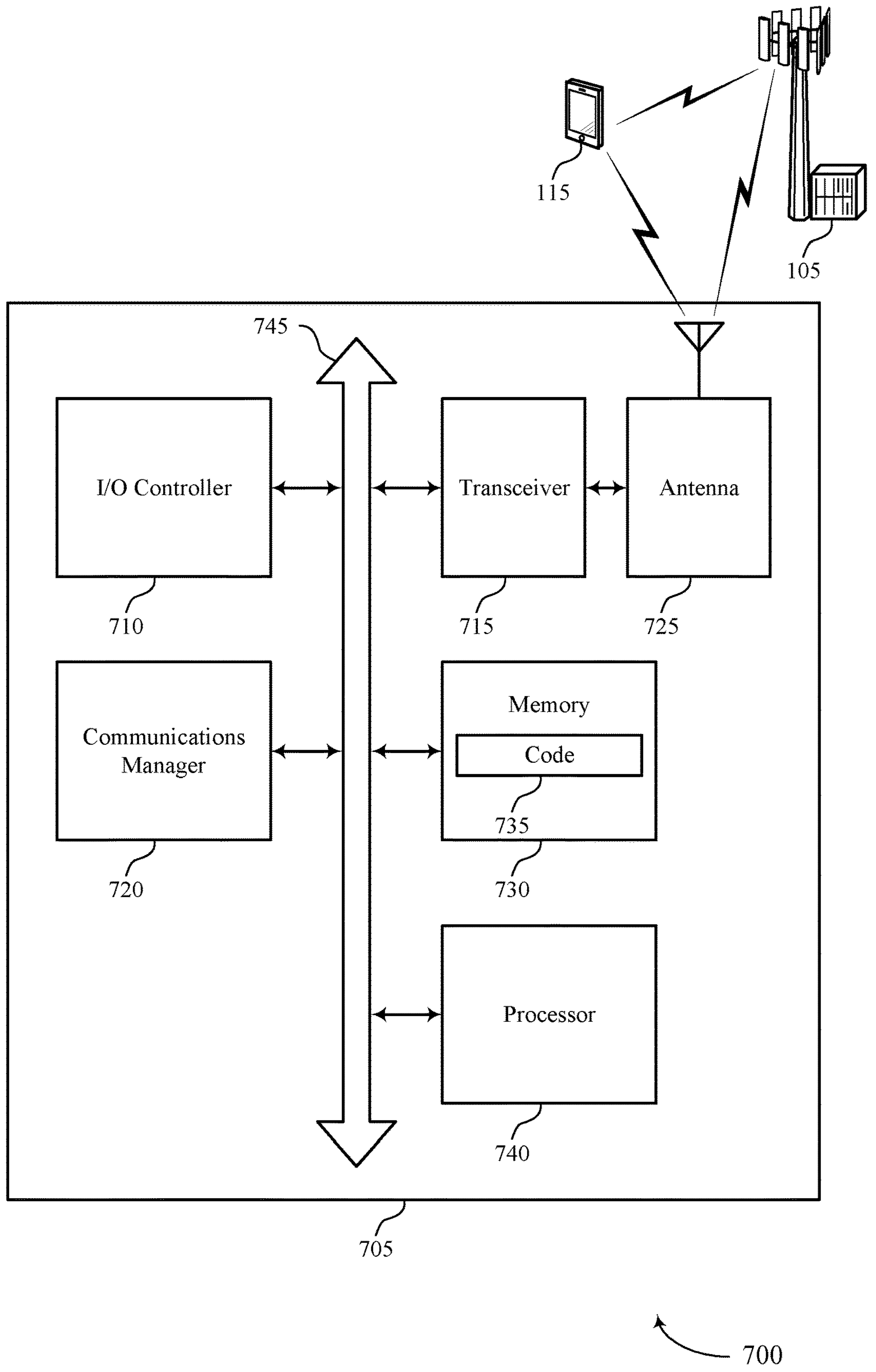
FIG. 7 shows a diagram of a system including a device that supports request based redundancy and early termination for outer coding in accordance with one or more aspects of the present disclosure.

FIG. 7 shows a diagram of a system 700 including a device 705 that supports request based redundancy and early termination for outer coding in accordance with one or more aspects of the present disclosure. The device 705 may be an example of or include components of a device 405, a device 505, or a UE 115 as described herein. The device 705 may communicate (e.g., wirelessly) with one or more other devices (e.g., network entities 105, UEs 115, or a combination thereof). The device 705 may include components for bi-directional voice and data communications including components for transmitting and receiving communications, such as a communications manager 720, an input/output (I/O) controller, such as an I/O controller 710, a transceiver 715, one or more antennas 725, at least one memory 730, code 735, and at least one processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally, or alternatively, the I/O controller 710 may represent or interact with a modem, a keyboard, a mouse, a touchscreen, or a similar device. In some cases, the I/O controller 710 may be implemented as part of one or more processors, such as the at least one processor 740. In some cases, a user may interact with the device 705 via the I/O controller 710 or via hardware components controlled by the I/O controller 710.

In some cases, the device 705 may include a single antenna. However, in some other cases, the device 705 may have more than one antenna, which may be capable of concurrently transmitting or receiving multiple wireless transmissions. The transceiver 715 may communicate bi-directionally via the one or more antennas 725 using wired or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The at least one memory 730 may include random access memory (RAM) and read-only memory (ROM). The at least one memory 730 may store computer-readable, computer-executable, or processor-executable code, such as the code 735. The code 735 may include instructions that, when executed by the at least one processor 740, cause the device 705 to perform various functions described herein. The code 735 may be stored in a non-transitory computer-readable medium such as system memory or another type of memory. In some cases, the code 735 may not be directly executable by the at least one processor 740 but may cause a computer (e.g., when compiled and executed) to perform functions described herein. In some cases, the at least one memory 730 may include, among other things, a basic I/O system (BIOS) which may control basic hardware or software operation such as the interaction with peripheral components or devices.

The at least one processor 740 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 740 may be configured to operate a memory array using a memory controller. In some other cases, a memory controller may be integrated into the at least one processor 740. The at least one processor 740 may be configured to execute computer-readable instructions stored in a memory (e.g., the at least one memory 730) to cause the device 705 to perform various functions (e.g., functions or tasks supporting request based redundancy and early termination for outer coding). For example, the device 705 or a component of the device 705 may include at least one processor 740 and at least one memory 730 coupled with or to the at least one processor 740, the at least one processor 740 and the at least one memory 730 configured to perform various functions described herein. In some examples, the at least one processor 740 may include multiple processors and the at least one memory 730 may include multiple memories. One or more of the multiple processors may be coupled with one or more of the multiple memories, which may, individually or collectively, be configured to perform various functions described herein. In some examples, the at least one processor 740 may be a component of a processing system, which may refer to a system (such as a series) of machines, circuitry (including, for example, one or both of processor circuitry (which may include the at least one processor 740) and memory circuitry (which may include the at least one memory 730)), or components, that receives or obtains inputs and processes the inputs to produce, generate, or obtain a set of outputs. The processing system may be configured to perform one or more of the functions described herein. For example, the at least one processor 740 or a processing system including the at least one processor 740 may be configured to, configurable to, or operable to cause the device 705 to perform one or more of the functions described herein. Further, as described herein, being "configured to," being "configurable to," and being "operable to" may be used interchangeably and may be associated with a capability, when executing code 735 (e.g., processor-executable code) stored in the at least one memory 730 or otherwise, to perform one or more of the functions described herein.

The communications manager 720 may support wireless communication in accordance with examples as disclosed herein. For example, the communications manager 720 is capable of, configured to, or operable to support a means for transmitting a control message including a request for outer coding of source symbols of a data set and indicating a requested quantity of redundancy parity symbols for the data set. The communications manager 720 is capable of, configured to, or operable to support a means for receiving, via a set of multiple symbols, a first data set including outer-encoded data, the set of multiple symbols including a set of multiple source symbols and one or more redundancy parity symbols that correspond to the requested quantity of redundancy parity symbols. The communications manager 720 is capable of, configured to, or operable to support a means for decoding the outer-encoded data received via the set of multiple source symbols and at least one of the one or more redundancy parity symbols to obtain a message.

Additionally, or alternatively, the communications manager 720 may support wireless communication in accordance with examples as disclosed herein. For example, the communications manager 720 is capable of, configured to, or operable to support a means for receiving, via a set of multiple symbols, a first data set including outer-encoded data, the set of multiple symbols including a set of multiple source symbols and one or more redundancy parity symbols. The communications manager 720 is capable of, configured to, or operable to support a means for decoding the outer-encoded data received via the set of multiple source symbols and at least one of the one or more redundancy parity symbols to obtain a message. The communications manager 720 is capable of, configured to, or operable to support a means for transmitting a control message requesting termination of transmission of one or more subsequent redundant parity symbols of the first data set based on successful decoding of the outer-encoded data to obtain the message.

By including or configuring the communications manager 720 in accordance with examples as described herein, the device 705 may support techniques for improved communication reliability, reduced latency, improved user experience related to reduced processing, reduced power consumption, more efficient utilization of communication resources, improved coordination between devices, longer battery life, and improved utilization of processing capability by enabling UE based requests for outer coding redundancy and early termination for outer coding redundancy transmission.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the at least one processor 740, the at least one memory 730, the code 735, or any combination thereof. For example, the code 735 may include instructions executable by the at least one processor 740 to cause the device 705 to perform various aspects of request based redundancy and early termination for outer coding as described herein, or the at least one processor 740 and the at least one memory 730 may be otherwise configured to, individually or collectively, perform or support such operations.

Figure 8:
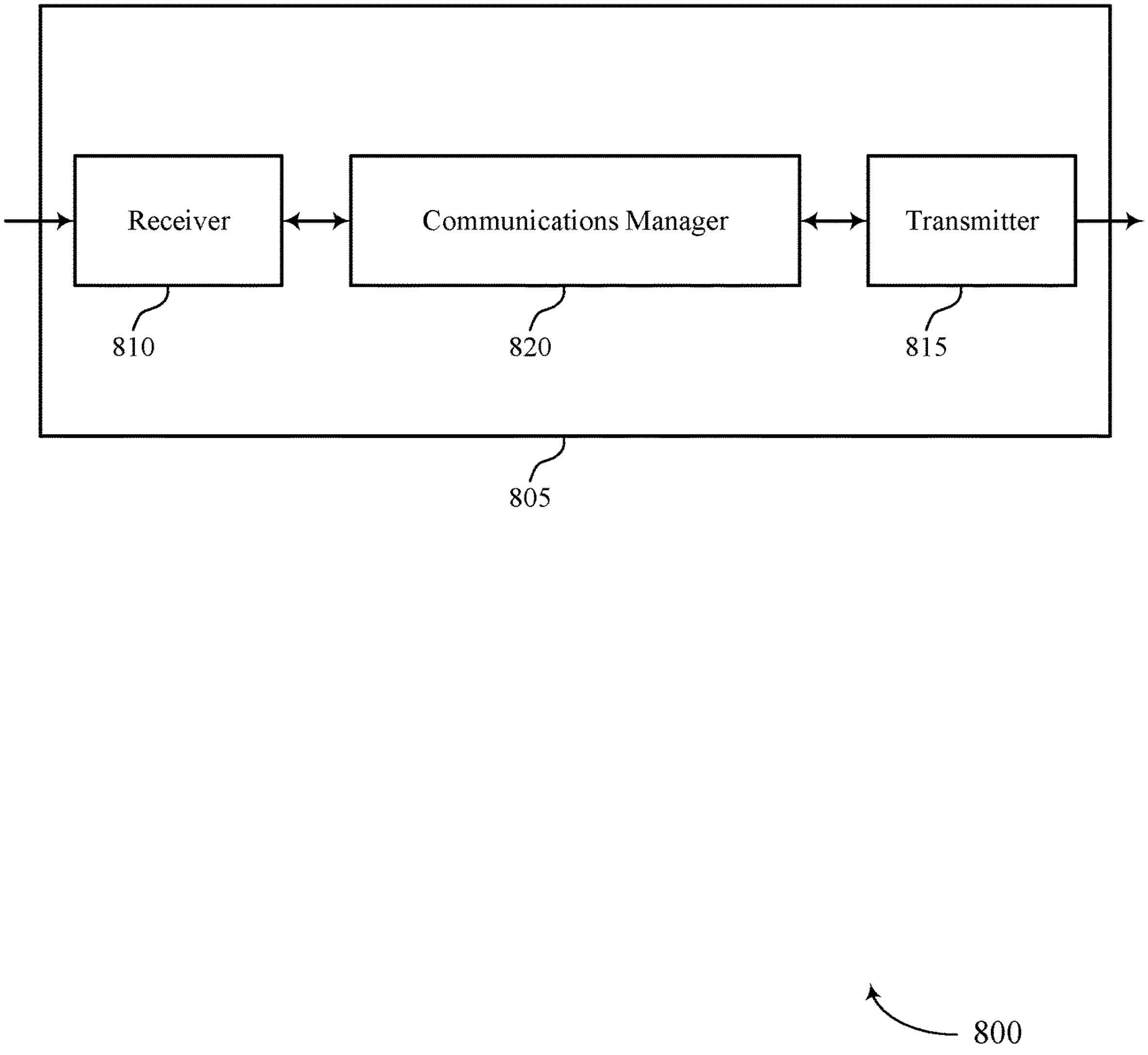
FIGS. 8 and 9 show block diagrams of devices that support request based redundancy and early termination for outer coding in accordance with one or more aspects of the present disclosure.

FIG. 8 shows a block diagram 800 of a device 805 that supports request based redundancy and early termination for outer coding in accordance with one or more aspects of the present disclosure. The device 805 may be an example of aspects of a network entity 105 as described herein. The device 805 may include a receiver 810, a transmitter 815, and a communications manager 820. The device 805, or one or more components of the device 805 (e.g., the receiver 810, the transmitter 815, the communications manager 820), may include at least one processor (not shown), which may be coupled with at least one memory (not shown), to, individually or collectively, support or enable the described techniques. Each of these components may be in communication with one another (e.g., via one or more buses (not shown)).

The receiver 810 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 805. In some examples, the receiver 810 may support obtaining information by receiving signals via one or more antennas. Additionally, or alternatively, the receiver 810 may support obtaining information by receiving signals via one or more wired (e.g., electrical, fiber optic) interfaces, wireless interfaces, or any combination thereof.

The transmitter 815 may provide a means for outputting (e.g., transmitting, providing, conveying, sending) information generated by other components of the device 805. For example, the transmitter 815 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 815 may support outputting information by transmitting signals via one or more antennas. Additionally, or alternatively, the transmitter 815 may support outputting information by transmitting signals via one or more wired (e.g., electrical, fiber optic) interfaces, wireless interfaces, or any combination thereof. In some examples, the transmitter 815 and the receiver 810 may be co-located in a transceiver, which may include or be coupled with a modem.

The communications manager 820, the receiver 810, the transmitter 815, or various combinations or components thereof may be examples of means for performing various aspects of request based redundancy and early termination for outer coding as described herein. For example, the communications manager 820, the receiver 810, the transmitter 815, or various combinations or components thereof may be capable of performing one or more of the functions described herein.

In some examples, the communications manager 820, the receiver 810, the transmitter 815, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 820, the receiver 810, the transmitter 815, or various combinations or components thereof may be implemented in code (e.g., as communications management software or firmware) executed by at least one processor (e.g., referred to as a processor-executable code). If implemented in code executed by at least one processor, the functions of the communications manager 820, the receiver 810, the transmitter 815, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 820 may be configured to perform various operations (e.g., receiving, obtaining, monitoring, outputting, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to obtain information, output information, or perform various other operations as described herein.

The communications manager 820 may support wireless communication in accordance with examples as disclosed herein. For example, the communications manager 820 is capable of, configured to, or operable to support a means for obtaining a control message including a request for outer coding of source symbols of a data set and indicating a requested quantity of redundancy parity symbols for the data set. The communications manager 820 is capable of, configured to, or operable to support a means for outputting, via a set of multiple symbols, a first data set including outer-encoded data, the set of multiple symbols including a set of multiple source symbols and one or more redundancy parity symbols that correspond to the requested quantity of redundancy parity symbols.

By including or configuring the communications manager 820 in accordance with examples as described herein, the device 805 (e.g., at least one processor controlling or otherwise coupled with the receiver 810, the transmitter 815, the communications manager 820, or a combination thereof) may support techniques for reduced processing, reduced power consumption, and more efficient utilization of communication resources by enabling UE based requests for outer coding redundancy and early termination for outer coding redundancy transmission.

Figure 9:
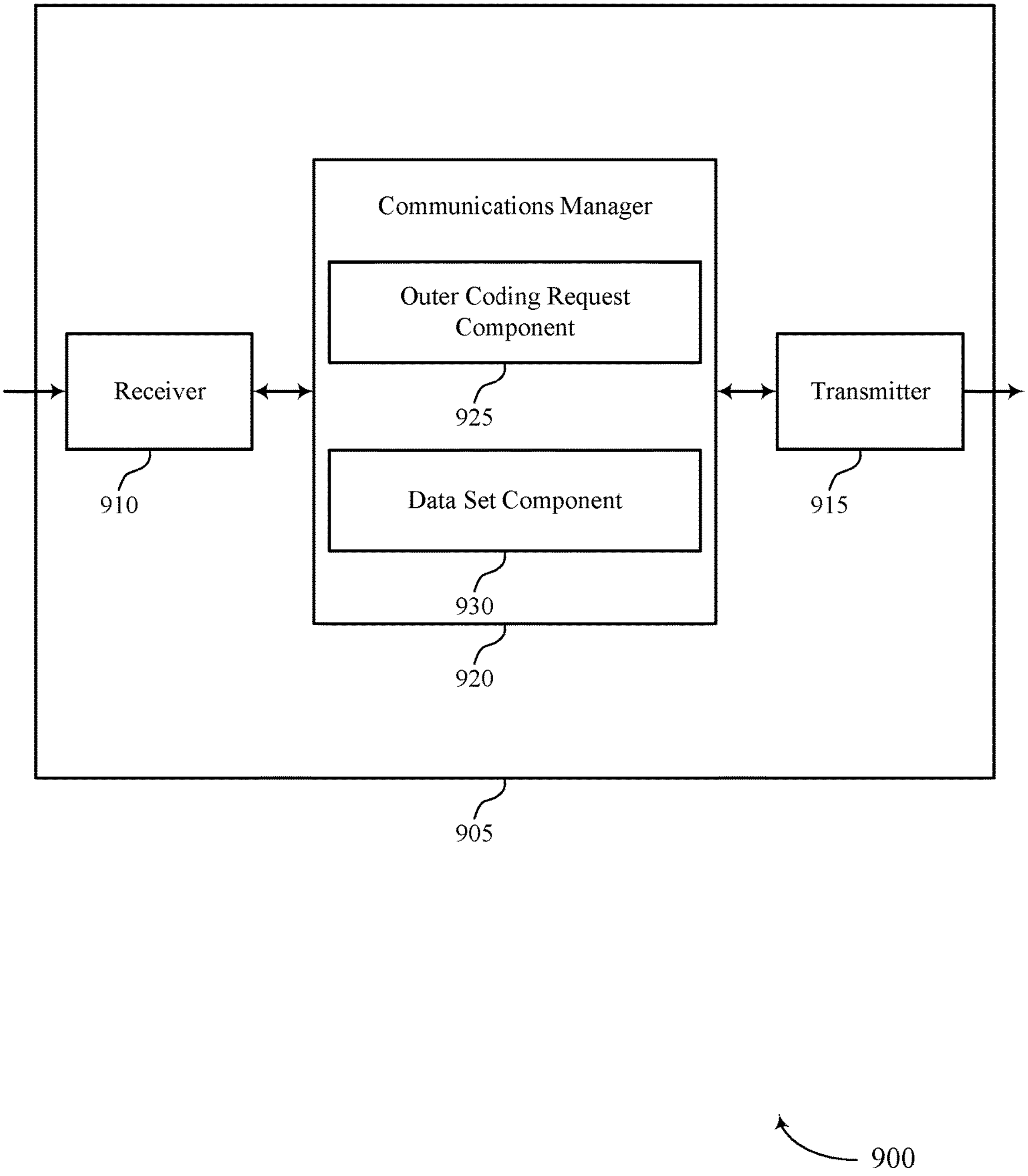

FIG. 9 shows a block diagram 900 of a device 905 that supports request based redundancy and early termination for outer coding in accordance with one or more aspects of the present disclosure. The device 905 may be an example of aspects of a device 805 or a network entity 105 as described herein. The device 905 may include a receiver 910, a transmitter 915, and a communications manager 920. The device 905, or one or more components of the device 905 (e.g., the receiver 910, the transmitter 915, the communications manager 920), may include at least one processor (not shown), which may be coupled with at least one memory (not shown), to support the described techniques. Each of these components may be in communication with one another (e.g., via one or more buses (not shown)).

The receiver 910 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 905. In some examples, the receiver 910 may support obtaining information by receiving signals via one or more antennas. Additionally, or alternatively, the receiver 910 may support obtaining information by receiving signals via one or more wired (e.g., electrical, fiber optic) interfaces, wireless interfaces, or any combination thereof.

The transmitter 915 may provide a means for outputting (e.g., transmitting, providing, conveying, sending) information generated by other components of the device 905. For example, the transmitter 915 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 915 may support outputting information by transmitting signals via one or more antennas. Additionally, or alternatively, the transmitter 915 may support outputting information by transmitting signals via one or more wired (e.g., electrical, fiber optic) interfaces, wireless interfaces, or any combination thereof. In some examples, the transmitter 915 and the receiver 910 may be co-located in a transceiver, which may include or be coupled with a modem.

The device 905, or various components thereof, may be an example of means for performing various aspects of request based redundancy and early termination for outer coding as described herein. For example, the communications manager 920 may include an outer coding request component 925 a data set component 930, or any combination thereof. The communications manager 920 may be an example of aspects of a communications manager 820 as described herein. In some examples, the communications manager 920, or various components thereof, may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. The outer coding request component 925 is capable of, configured to, or operable to support a means for obtaining a control message including a request for outer coding of source symbols of a data set and indicating a requested quantity of redundancy parity symbols for the data set. The data set component 930 is capable of, configured to, or operable to support a means for outputting, via a set of multiple symbols, a first data set including outer-encoded data, the set of multiple symbols including a set of multiple source symbols and one or more redundancy parity symbols that correspond to the requested quantity of redundancy parity symbols.

Figure 10:
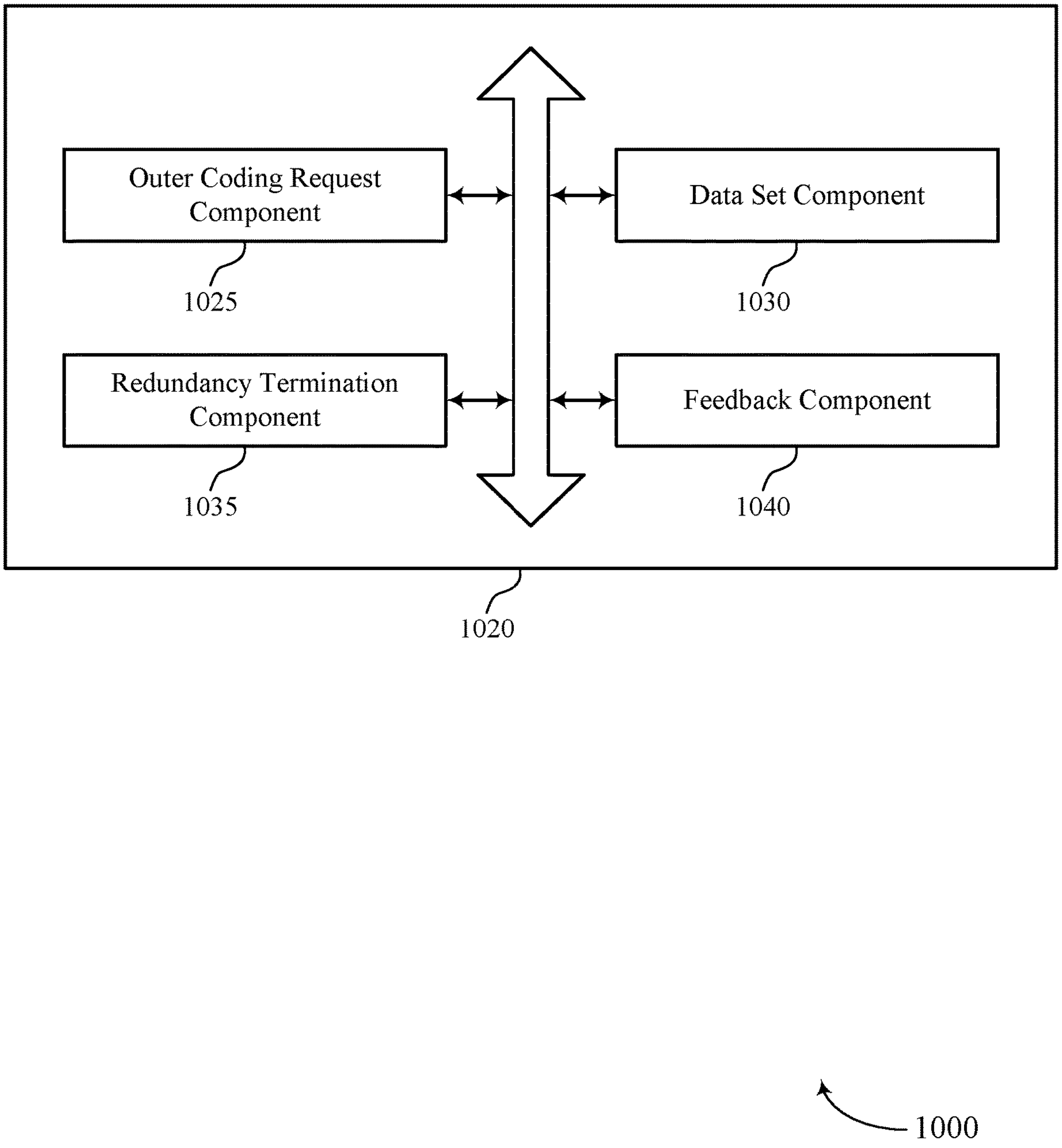
FIG. 10 shows a block diagram of a communications manager that supports request based redundancy and early termination for outer coding in accordance with one or more aspects of the present disclosure.

FIG. 10 shows a block diagram 1000 of a communications manager 1020 that supports request based redundancy and early termination for outer coding in accordance with one or more aspects of the present disclosure. The communications manager 1020 may be an example of aspects of a communications manager 820, a communications manager 920, or both, as described herein. The communications manager 1020, or various components thereof, may be an example of means for performing various aspects of request based redundancy and early termination for outer coding as described herein. For example, the communications manager 1020 may include an outer coding request component 1025, a data set component 1030, a redundancy termination component 1035, a feedback component 1040, or any combination thereof. Each of these components, or components or subcomponents thereof (e.g., one or more processors, one or more memories), may communicate, directly or indirectly, with one another (e.g., via one or more buses). The communications may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1020 may support wireless communication in accordance with examples as disclosed herein. The outer coding request component 1025 is capable of, configured to, or operable to support a means for obtaining a control message including a request for outer coding of source symbols of a data set and indicating a requested quantity of redundancy parity symbols for the data set. The data set component 1030 is capable of, configured to, or operable to support a means for outputting, via a set of multiple symbols, a first data set including outer-encoded data, the set of multiple symbols including a set of multiple source symbols and one or more redundancy parity symbols that correspond to the requested quantity of redundancy parity symbols.

In some examples, the redundancy termination component 1035 is capable of, configured to, or operable to support a means for obtaining a second control message requesting termination of transmission of one or more subsequent redundant parity symbols of the first data set. In some examples, the redundancy termination component 1035 is capable of, configured to, or operable to support a means for terminating transmission of the one or more subsequent redundant parity symbols of the first data set based on the second control message.

In some examples, the feedback component 1040 is capable of, configured to, or operable to support a means for obtaining UCI requesting feedback for a second control message that requests termination of transmission of one or more subsequent redundant parity symbols of the first data set. In some examples, the feedback component 1040 is capable of, configured to, or operable to support a means for outputting a feedback message indicating whether the second control message was successfully received.

In some examples, the feedback component 1040 is capable of, configured to, or operable to support a means for obtaining UCI including feedback associated with decoding of at least a defined quantity of the set of multiple symbols of the first data set. In some examples, the redundancy termination component 1035 is capable of, configured to, or operable to support a means for terminating transmission of one or more subsequent redundant parity symbols of the first data set based on a quantity of successfully received symbols indicated by the feedback satisfying a threshold quantity of received symbols or based on a quantity of estimated successfully decoded symbols satisfying a threshold quantity of decoded symbols.

In some examples, the control message requests a first quantity of redundancy parity symbols for one or more data sets communicated during a first time window and a second quantity of redundancy parity symbols for one or more data sets communicated during a second time window.

In some examples, the control message requests a first quantity of redundancy parity symbols for the first data set and a second quantity of redundancy parity symbols for a second data set.

In some examples, the control message includes UCI, a MAC-CE, or an RRC message.

In some examples, the control message is an aperiodic control message or the control message is one of a set of multiple control messages that are periodically transmitted.

Figure 11:
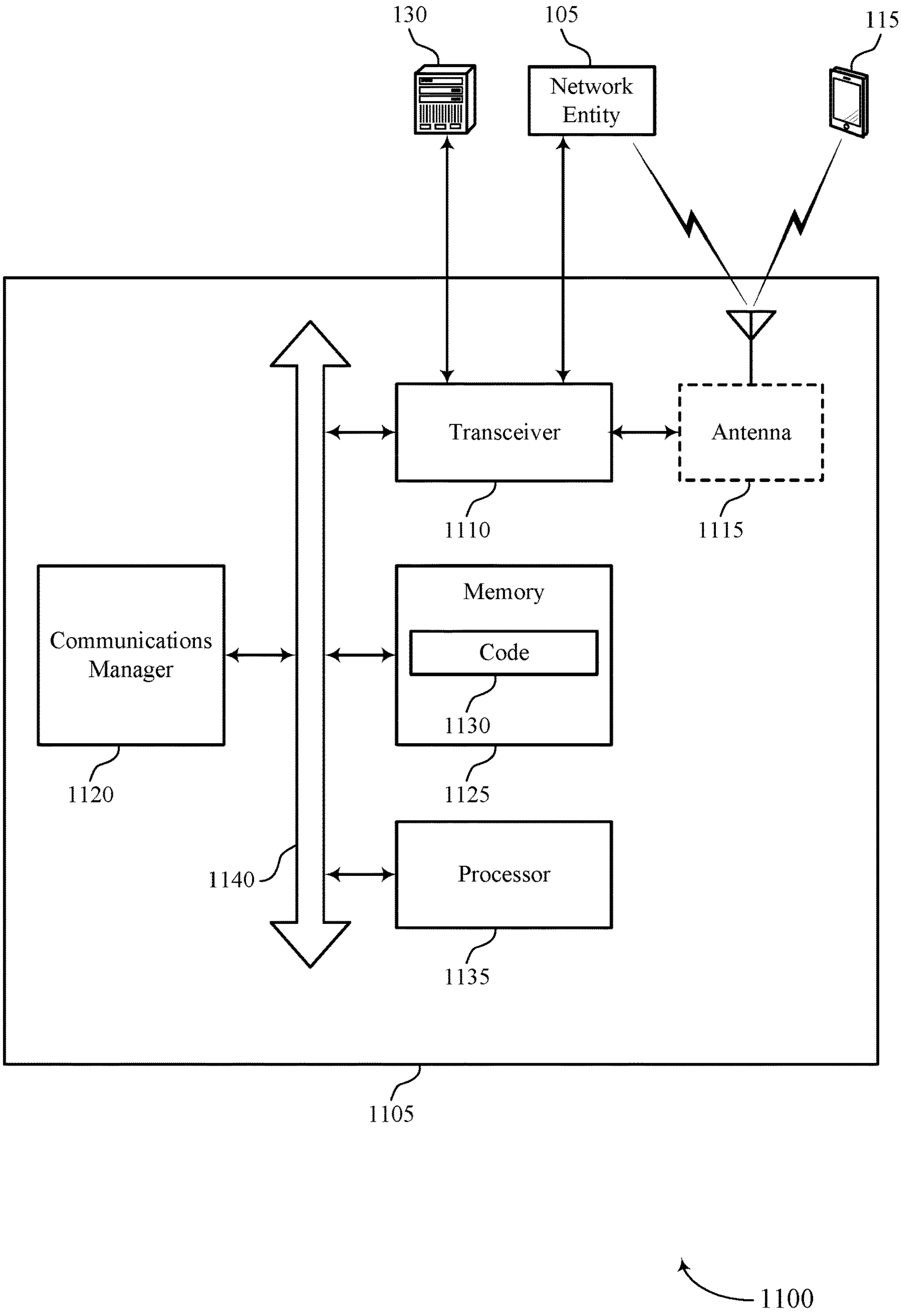
FIG. 11 shows a diagram of a system including a device that supports request based redundancy and early termination for outer coding in accordance with one or more aspects of the present disclosure.

FIG. 11 shows a diagram of a system 1100 including a device 1105 that supports request based redundancy and early termination for outer coding in accordance with one or more aspects of the present disclosure. The device 1105 may be an example of or include components of a device 805, a device 905, or a network entity 105 as described herein. The device 1105 may communicate with other network devices or network equipment such as one or more of the network entities 105, UEs 115, or any combination thereof. The communications may include communications over one or more wired interfaces, over one or more wireless interfaces, or any combination thereof. The device 1105 may include components that support outputting and obtaining communications, such as a communications manager 1120, a transceiver 1110, one or more antennas 1115, at least one memory

1125, code 1130, and at least one processor 1135. These components may be in electronic communication or otherwise coupled (e.g., operatively, communicatively, functionally, electronically, electrically) via one or more buses (e.g., a bus 1140).

The transceiver 1110 may support bi-directional communications via wired links, wireless links, or both as described herein. In some examples, the transceiver 1110 may include a wired transceiver and may communicate bi-directionally with another wired transceiver. Additionally, or alternatively, in some examples, the transceiver 1110 may include a wireless transceiver and may communicate bi-directionally with another wireless transceiver. In some examples, the device 1105 may include one or more antennas 1115, which may be capable of transmitting or receiving wireless transmissions (e.g., concurrently). The transceiver 1110 may also include a modem to modulate signals, to provide the modulated signals for transmission (e.g., by one or more antennas 1115, by a wired transmitter), to receive modulated signals (e.g., from one or more antennas 1115, from a wired receiver), and to demodulate signals. In some implementations, the transceiver 1110 may include one or more interfaces, such as one or more interfaces coupled with the one or more antennas 1115 that are configured to support various receiving or obtaining operations, or one or more interfaces coupled with the one or more antennas 1115 that are configured to support various transmitting or outputting operations, or a combination thereof. In some implementations, the transceiver 1110 may include or be configured for coupling with one or more processors or one or more memory components that are operable to perform or support operations based on received or obtained information or signals, or to generate information or other signals for transmission or other outputting, or any combination thereof. In some implementations, the transceiver 1110, or the transceiver 1110 and the one or more antennas 1115, or the transceiver 1110 and the one or more antennas 1115 and one or more processors or one or more memory components (e.g., the at least one processor 1135, the at least one memory 1125, or both), may be included in a chip or chip assembly that is installed in the device 1105. In some examples, the transceiver 1110 may be operable to support communications via one or more communications links (e.g., communication link(s) 125, backhaul communication link(s) 120, a midhaul communication link 162, a fronthaul communication link 168).

The at least one memory 1125 may include RAM, ROM, or any combination thereof. The at least one memory 1125 may store computer-readable, computer-executable, or processor-executable code, such as the code 1130. The code 1130 may include instructions that, when executed by one or more of the at least one processor 1135, cause the device 1105 to perform various functions described herein. The code 1130 may be stored in a non-transitory computer-readable medium such as system memory or another type of memory. In some cases, the code 1130 may not be directly executable by a processor of the at least one processor 1135 but may cause a computer (e.g., when compiled and executed) to perform functions described herein. In some cases, the at least one memory 1125 may include, among other things, a BIOS which may control basic hardware or software operation such as the interaction with peripheral components or devices. In some examples, the at least one processor 1135 may include multiple processors and the at least one memory 1125 may include multiple memories. One or more of the multiple processors may be coupled with one or more of the multiple memories which may, individually or collectively, be configured to perform various functions herein (for example, as part of a processing system).

The at least one processor 1135 may include one or more intelligent hardware devices (e.g., one or more general-purpose processors, one or more DSPs, one or more central processing units (CPUs), one or more graphics processing units (GPUs), one or more neural processing units (NPUs) (also referred to as neural network processors or deep learning processors (DLPs)), one or more microcontrollers, one or more ASICs, one or more FPGAs, one or more programmable logic devices, discrete gate or transistor logic, one or more discrete hardware components, or any combination thereof). In some cases, the at least one processor 1135 may be configured to operate a memory array using a memory controller. In some other cases, a memory controller may be integrated into one or more of the at least one processor 1135. The at least one processor 1135 may be configured to execute computer-readable instructions stored in a memory (e.g., one or more of the at least one memory 1125) to cause the device 1105 to perform various functions (e.g., functions or tasks supporting request based redundancy and early termination for outer coding). For example, the device 1105 or a component of the device 1105 may include at least one processor 1135 and at least one memory 1125 coupled with one or more of the at least one processor 1135, the at least one processor 1135 and the at least one memory 1125 configured to perform various functions described herein. The at least one processor 1135 may be an example of a cloud-computing platform (e.g., one or more physical nodes and supporting software such as operating systems, virtual machines, or container instances) that may host the functions (e.g., by executing code 1130) to perform the functions of the device 1105. The at least one processor 1135 may be any one or more suitable processors capable of executing scripts or instructions of one or more software programs stored in the device 1105 (such as within one or more of the at least one memory 1125). In some examples, the at least one processor 1135 may include multiple processors and the at least one memory 1125 may include multiple memories. One or more of the multiple processors may be coupled with one or more of the multiple memories, which may, individually or collectively, be configured to perform various functions herein. In some examples, the at least one processor 1135 may be a component of a processing system, which may refer to a system (such as a series) of machines, circuitry (including, for example, one or both of processor circuitry (which may include the at least one processor 1135) and memory circuitry (which may include the at least one memory 1125)), or components, that receives or obtains inputs and processes the inputs to produce, generate, or obtain a set of outputs. The processing system may be configured to perform one or more of the functions described herein. For example, the at least one processor 1135 or a processing system including the at least one processor 1135 may be configured to, configurable to, or operable to cause the device 1105 to perform one or more of the functions described herein. Further, as described herein, being "configured to," being "configurable to," and being "operable to" may be used interchangeably and may be associated with a capability, when executing code stored in the at least one memory 1125 or otherwise, to perform one or more of the functions described herein.

In some examples, a bus 1140 may support communications of (e.g., within) a protocol layer of a protocol stack. In some examples, a bus 1140 may support communications associated with a logical channel of a protocol stack (e.g., between protocol layers of a protocol stack), which may include communications performed within a component of the device 1105, or between different components of the device 1105 that may be co-located or located in different locations (e.g., where the device 1105 may refer to a system in which one or more of the communications manager 1120, the transceiver 1110, the at least one memory 1125, the code 1130, and the at least one processor 1135 may be located in one of the different components or divided between different components).

In some examples, the communications manager 1120 may manage aspects of communications with a core network 130 (e.g., via one or more wired or wireless backhaul links). For example, the communications manager 1120 may manage the transfer of data communications for client devices, such as one or more UEs 115. In some examples, the communications manager 1120 may manage communications with one or more other network devices 105, and may include a controller or scheduler for controlling communications with UEs 115 (e.g., in cooperation with the one or more other network devices). In some examples, the communications manager 1120 may support an X2 interface within an LTE/LTE-A wireless communications network technology to provide communication between network entities 105.

The communications manager 1120 may support wireless communication in accordance with examples as disclosed herein. For example, the communications manager 1120 is capable of, configured to, or operable to support a means for obtaining a control message including a request for outer coding of source symbols of a data set and indicating a requested quantity of redundancy parity symbols for the data set. The communications manager 1120 is capable of, configured to, or operable to support a means for outputting, via a set of multiple symbols, a first data set including outer-encoded data, the set of multiple symbols including a set of multiple source symbols and one or more redundancy parity symbols that correspond to the requested quantity of redundancy parity symbols.

By including or configuring the communications manager 1120 in accordance with examples as described herein, the device 1105 may support techniques for improved communication reliability, reduced latency, improved user experience related to reduced processing, reduced power consumption, more efficient utilization of communication resources, improved coordination between devices, longer battery life, and improved utilization of processing capability by enabling UE based requests for outer coding redundancy and early termination for outer coding redundancy transmission.

In some examples, the communications manager 1120 may be configured to perform various operations (e.g., receiving, obtaining, monitoring, outputting, transmitting) using or otherwise in cooperation with the transceiver 1110, the one or more antennas 1115 (e.g., where applicable), or any combination thereof. Although the communications manager 1120 is illustrated as a separate component, in some examples, one or more functions described with reference to the communications manager 1120 may be supported by or performed by the transceiver 1110, one or more of the at least one processor 1135, one or more of the at least one memory 1125, the code 1130, or any combination thereof (for example, by a processing system including at least a portion of the at least one processor 1135, the at least one memory 1125, the code 1130, or any combination thereof). For example, the code 1130 may include instructions executable by one or more of the at least one processor 1135 to cause the device 1105 to perform various aspects of request based redundancy and early termination for outer coding as described herein, or the at least one processor 1135 and the at least one memory 1125 may be otherwise configured to, individually or collectively, perform or support such operations.

Figure 12:
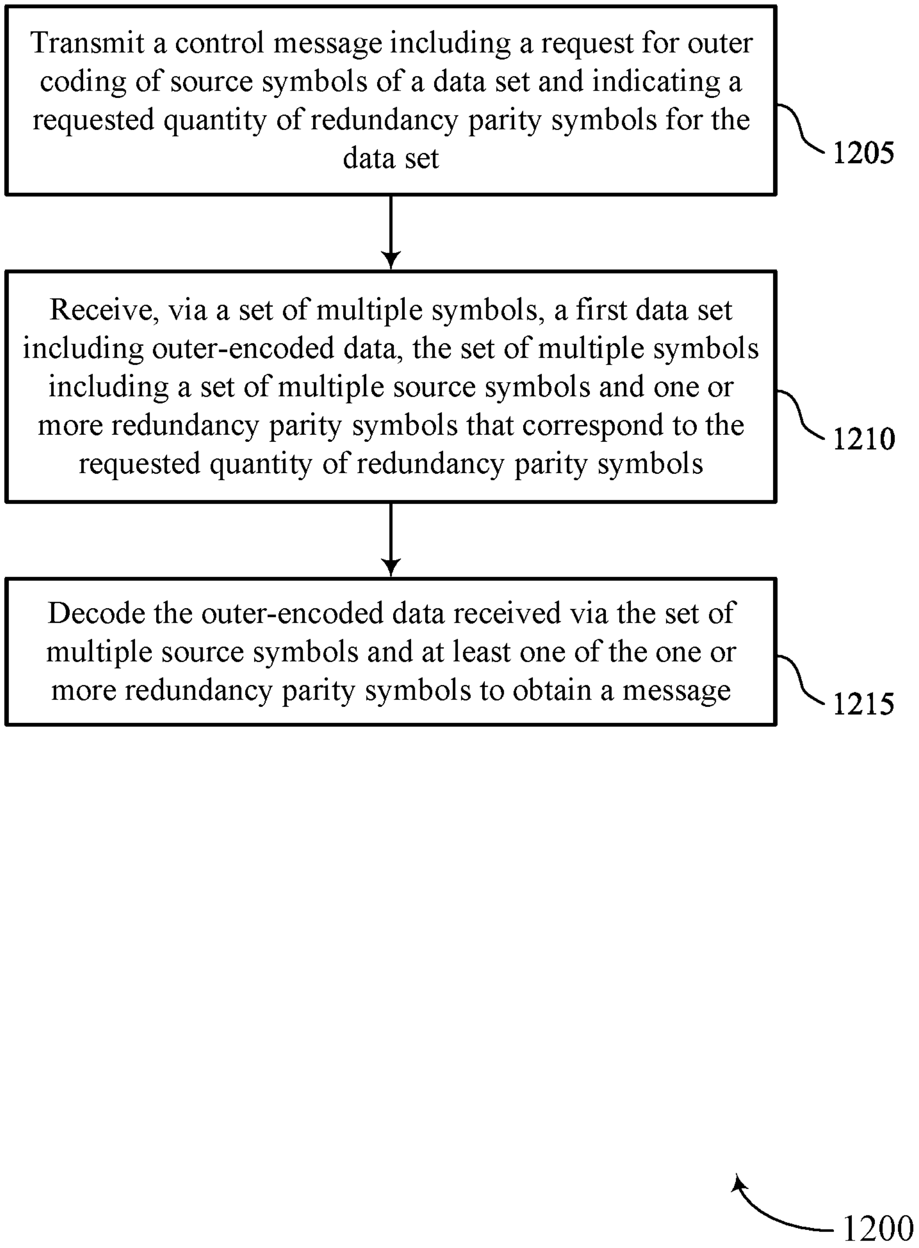
FIGS. 12 through 14 show flowcharts illustrating methods that support request based redundancy and early termination for outer coding in accordance with one or more aspects of the present disclosure.

FIG. 12 shows a flowchart illustrating a method 1200 that supports request based redundancy and early termination for outer coding in accordance with one or more aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1205, the method may include transmitting a control message including a request for outer coding of source symbols of a data set and indicating a requested quantity of redundancy parity symbols for the data set. The operations of 1205 may be performed in accordance with examples as disclosed herein. In some examples, aspects of the operations of 1205 may be performed by an outer coding request component 625 as described with reference to FIG. 6.

At 1210, the method may include receiving, via a set of multiple symbols, a first data set including outer-encoded data, the set of multiple symbols including a set of multiple source symbols and one or more redundancy parity symbols that correspond to the requested quantity of redundancy parity symbols. The operations of 1210 may be performed in accordance with examples as disclosed herein. In some examples, aspects of the operations of 1210 may be performed by a data set component 630 as described with reference to FIG. 6.

At 1215, the method may include decoding the outer-encoded data received via the set of multiple source symbols and at least one of the one or more redundancy parity symbols to obtain a message. The operations of 1215 may be performed in accordance with examples as disclosed herein. In some examples, aspects of the operations of 1215 may be performed by a decoding component 635 as described with reference to FIG. 6.

Figure 13:
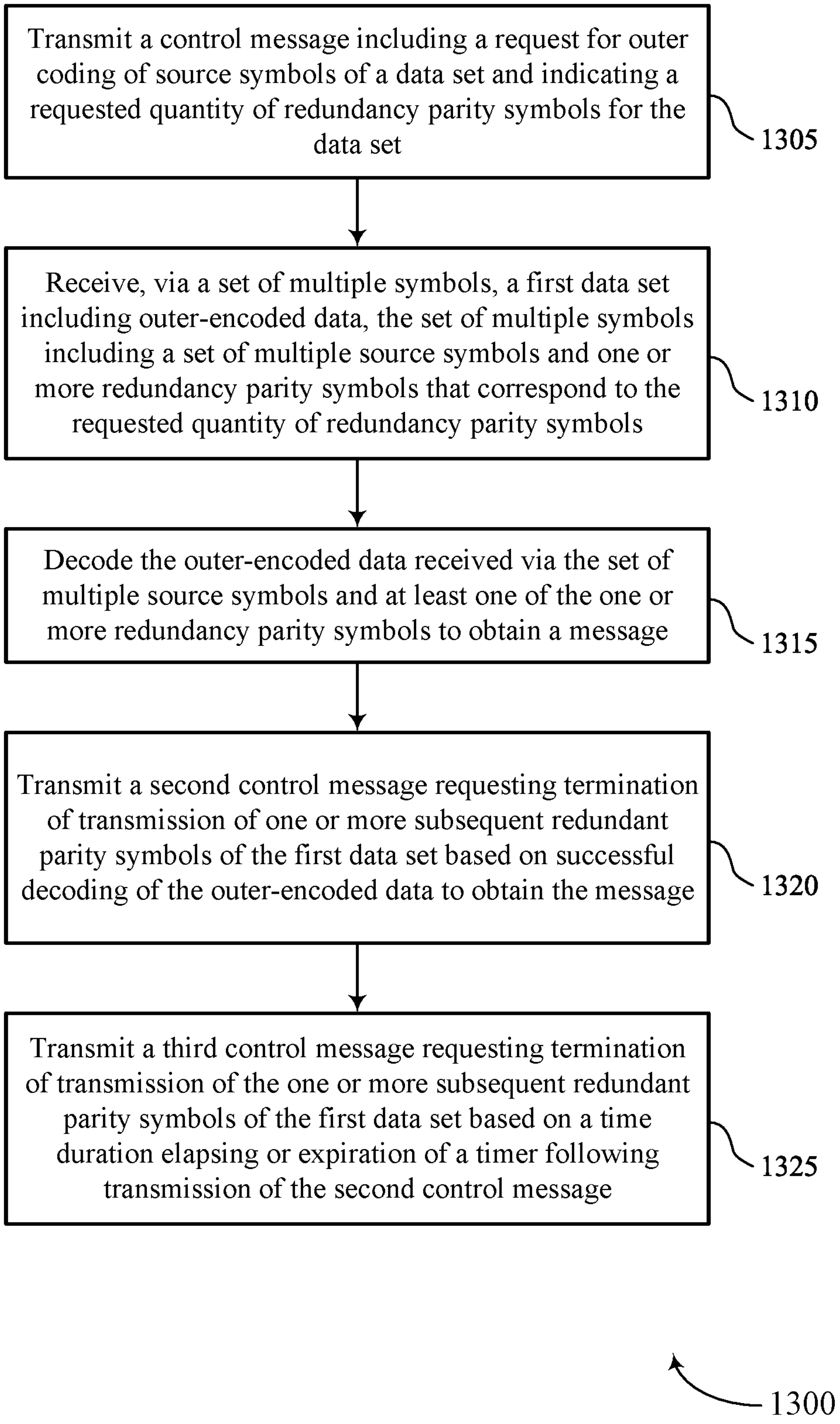

FIG. 13 shows a flowchart illustrating a method 1300 that supports request based redundancy and early termination for outer coding in accordance with one or more aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally, or alternatively, the UE may perform aspects of the described functions using special-purpose hardware.

At 1305, the method may include transmitting a control message including a request for outer coding of source symbols of a data set and indicating a requested quantity of redundancy parity symbols for the data set. The operations of 1305 may be performed in accordance with examples as disclosed herein. In some examples, aspects of the operations of 1305 may be performed by an outer coding request component 625 as described with reference to FIG. 6.

At 1310, the method may include receiving, via a set of multiple symbols, a first data set including outer-encoded data, the set of multiple symbols including a set of multiple source symbols and one or more redundancy parity symbols that correspond to the requested quantity of redundancy parity symbols. The operations of 1310 may be performed in accordance with examples as disclosed herein. In some examples, aspects of the operations of 1310 may be performed by a data set component 630 as described with reference to FIG. 6.

At 1315, the method may include decoding the outer-encoded data received via the set of multiple source symbols and at least one of the one or more redundancy parity symbols to obtain a message. The operations of 1315 may be performed in accordance with examples as disclosed herein. In some examples, aspects of the operations of 1315 may be performed by a decoding component 635 as described with reference to FIG. 6.

At 1320, the method may include transmitting a second control message requesting termination of transmission of one or more subsequent redundant parity symbols of the first data set based on successful decoding of the outer-encoded data to obtain the message. The operations of 1320 may be performed in accordance with examples as disclosed herein. In some examples, aspects of the operations of 1320 may be performed by a redundancy termination component 640 as described with reference to FIG. 6.

At 1325, the method may include transmitting a third control message requesting termination of transmission of the one or more subsequent redundant parity symbols of the first data set based on a time duration elapsing or expiration of a timer following transmission of the second control message. The operations of 1325 may be performed in accordance with examples as disclosed herein. In some examples, aspects of the operations of 1325 may be performed by a redundancy termination component 640 as described with reference to FIG. 6.

Figure 14:
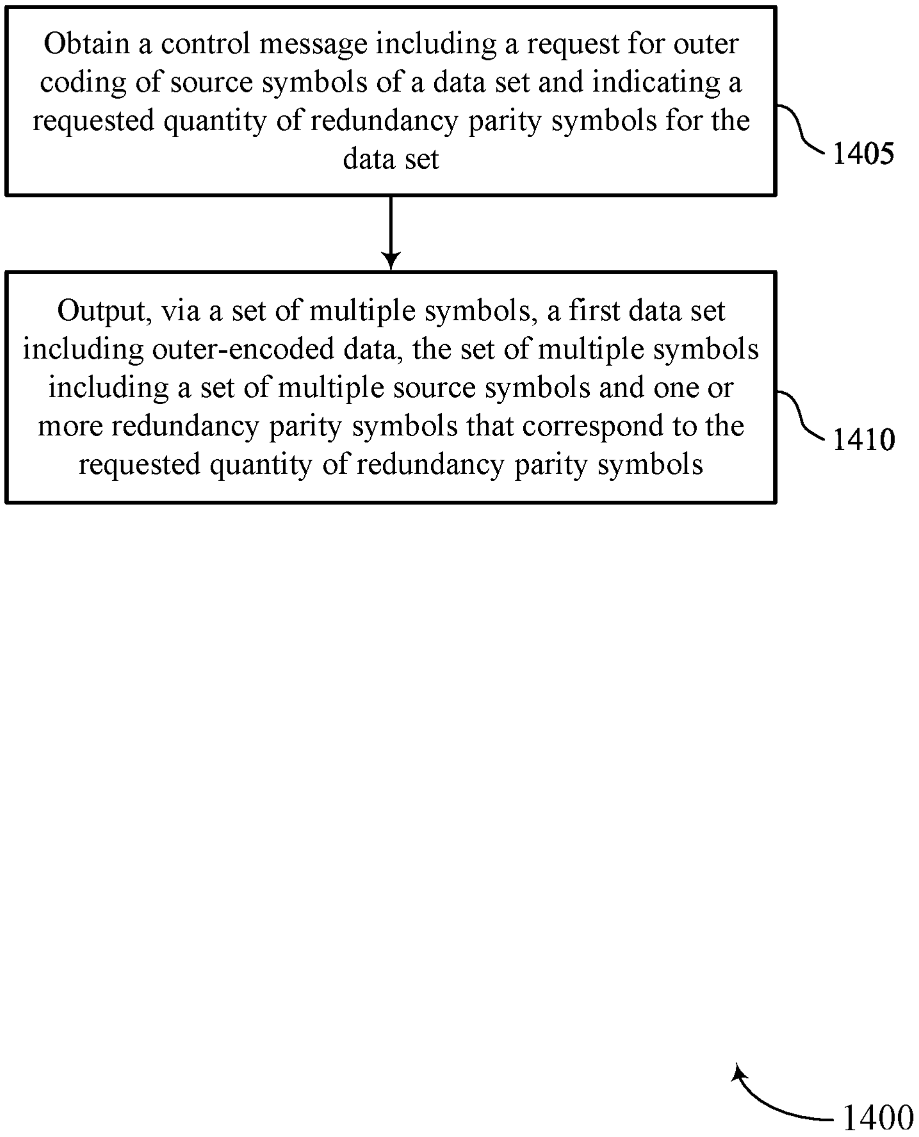

FIG. 14 shows a flowchart illustrating a method 1400 that supports request based redundancy and early termination for outer coding in accordance with one or more aspects of the present disclosure. The operations of the method 1400 may be implemented by a network entity or its components as described herein. For example, the operations of the method 1400 may be performed by a network entity as described with reference to FIGS. 1 through 3 and 8 through 11. In some examples, a network entity may execute a set of instructions to control the functional elements of the network entity to perform the described functions. Additionally, or alternatively, the network entity may perform aspects of the described functions using special-purpose hardware.

At 1405, the method may include obtaining a control message including a request for outer coding of source symbols of a data set and indicating a requested quantity of redundancy parity symbols for the data set. The operations of 1405 may be performed in accordance with examples as disclosed herein. In some examples, aspects of the operations of 1405 may be performed by an outer coding request component 1025 as described with reference to FIG. 10.

At 1410, the method may include outputting, via a set of multiple symbols, a first data set including outer-encoded data, the set of multiple symbols including a set of multiple source symbols and one or more redundancy parity symbols that correspond to the requested quantity of redundancy parity symbols. The operations of 1410 may be performed in accordance with examples as disclosed herein. In some examples, aspects of the operations of 1410 may be performed by a data set component 1030 as described with reference to FIG. 10.

The following provides an overview of aspects of the present disclosure:

Aspect 1: A method for wireless communication by an apparatus (e.g., a UE), comprising: transmitting a control message comprising a request for outer coding of source symbols of a data set and indicating a requested quantity of redundancy parity symbols for the data set; receiving, via a plurality of symbols, a first data set comprising outer-encoded data, the plurality of symbols comprising a plurality of source symbols and one or more redundancy parity symbols that correspond to the requested quantity of redundancy parity symbols; and decoding the outer-encoded data received via the plurality of source symbols and at least one of the one or more redundancy parity symbols to obtain a message.

Aspect 2: The method of aspect 1, further comprising: transmitting a second control message requesting termination of transmission of one or more subsequent redundant parity symbols of the first data set based at least in part on successful decoding of the outer-encoded data to obtain the message.

Aspect 3: The method of aspect 2, further comprising: transmitting a third control message requesting termination of transmission of the one or more subsequent redundant parity symbols of the first data set based at least in part on a time duration elapsing or expiration of a timer following transmission of the second control message.

Aspect 4: The method of aspect 3, further comprising: transmitting UCI requesting feedback for the third control message.

Aspect 5: The method of any of aspects 1 through 4, further comprising: transmitting a second control message requesting termination of transmission of one or more subsequent redundant parity symbols of the first data set based at least in part on successful decoding of at least a defined quantity of the plurality of symbols of the first data set.

Aspect 6: The method of aspect 5, wherein the second control message is transmitted subsequent to a time window elapsing after successful decoding of at least the defined quantity of the plurality of symbols of the first data set, the time window corresponding to a quantity of slots, a quantity of symbol periods, or a quantity of time.

Aspect 7: The method of any of aspects 5 through 6, wherein the second control message is transmitted based at least in part on an expiration of a timer after successful decoding of at least the defined quantity of the plurality of symbols of the first data set.

Aspect 8: The method of any of aspects 1 through 7, wherein the control message requests a first quantity of redundancy parity symbols for one or more data sets communicated during a first time window and a second quantity of redundancy parity symbols for one or more data sets communicated during a second time window.

Aspect 9: The method of any of aspects 1 through 8, wherein the requested quantity of redundancy parity symbols is determined by a machine learning model based at least in part on historical data, a predicted traffic level, blockage data, a handover prediction, or any combination thereof.

Aspect 10: The method of any of aspects 1 through 9, wherein the requested quantity of redundancy parity symbols is based at least in part on channel quality, CSI, latency, a drop rate, or any combination thereof.

Aspect 11: The method of any of aspects 1 through 10, wherein the control message requests a first quantity of redundancy parity symbols for the first data set and a second quantity of redundancy parity symbols for a second data set.

Aspect 12: The method of any of aspects 1 through 11, wherein the control message comprises UCI, a MAC-CE, or an RRC message.

Aspect 13: The method of any of aspects 1 through 12, wherein the control message is an aperiodic control message or the control message is one of a plurality of control messages that are periodically transmitted.

Aspect 14: A method for wireless communication by an apparatus (e.g., a network entity), comprising: obtaining a control message comprising a request for outer coding of source symbols of a data set and indicating a requested quantity of redundancy parity symbols for the data set; and outputting, via a plurality of symbols, a first data set comprising outer-encoded data, the plurality of symbols comprising a plurality of source symbols and one or more redundancy parity symbols that correspond to the requested quantity of redundancy parity symbols.

Aspect 15: The method of aspect 14, further comprising: obtaining a second control message requesting termination of transmission of one or more subsequent redundant parity symbols of the first data set; and terminating transmission of the one or more subsequent redundant parity symbols of the first data set based at least in part on the second control message.

Aspect 16: The method of any of aspects 14 through 15, further comprising: obtaining UCI requesting feedback for a second control message that requests termination of transmission of one or more subsequent redundant parity symbols of the first data set; and outputting a feedback message indicating whether the second control message was successfully received.

Aspect 17: The method of any of aspects 14 through 16, further comprising: obtaining UCI comprising feedback associated with decoding of at least a defined quantity of the plurality of symbols of the first data set; and terminating transmission of one or more subsequent redundant parity symbols of the first data set based at least in part on a quantity of successfully received symbols indicated by the feedback satisfying a threshold quantity of received symbols or based at least in part on a quantity of estimated successfully decoded symbols satisfying a threshold quantity of decoded symbols.

Aspect 18: The method of any of aspects 14 through 17, wherein the control message requests a first quantity of redundancy parity symbols for one or more data sets communicated during a first time window and a second quantity of redundancy parity symbols for one or more data sets communicated during a second time window.

Aspect 19: The method of any of aspects 14 through 18, wherein the control message requests a first quantity of redundancy parity symbols for the first data set and a second quantity of redundancy parity symbols for a second data set.

Aspect 20: The method of any of aspects 14 through 19, wherein the control message comprises UCI, a MAC-CE, or an RRC message.

Aspect 21: The method of any of aspects 14 through 20, wherein the control message is an aperiodic control message or the control message is one of a plurality of control messages that are periodically transmitted.

Aspect 22: A method for wireless communication by an apparatus (e.g., a UE), comprising: receiving, via a plurality of symbols, a first data set comprising outer-encoded data, the plurality of symbols comprising a plurality of source symbols and one or more redundancy parity symbols; decoding the outer-encoded data received via the plurality of source symbols and at least one of the one or more redundancy parity symbols to obtain a message; and transmitting a control message requesting termination of transmission of one or more subsequent redundant parity symbols of the first data set based at least in part on successful decoding of the outer-encoded data to obtain the message.

Aspect 23: An apparatus (e.g., a UE), comprising: at least one memory coupled with the at least one processor, with instructions stored in the at least one memory, the instructions being executable by the at least one processor, individually or in any combination, to cause the apparatus to perform a method of any of aspects 1 through 13.

Aspect 24: An apparatus (e.g., a UE), comprising at least one means for performing a method of any of aspects 1 through 13.

Aspect 25: A non-transitory computer-readable medium storing code for wireless communication, the code comprising instructions executable by one or more processors to perform a method of any of aspects 1 through 13.

Aspect 26: An apparatus (e.g., a network entity), comprising: at least one memory coupled with the at least one processor, with instructions stored in the at least one memory, the instructions being executable by the at least one processor, individually or in any combination, to cause the apparatus to perform a method of any of aspects 14 through 21.

Aspect 27: An apparatus (e.g., a network entity), comprising at least one means for performing a method of any of aspects 14 through 21.

Aspect 28: A non-transitory computer-readable medium storing code for wireless communication, the code comprising instructions executable by one or more processors to perform a method of any of aspects 14 through 21.

Aspect 29: An apparatus (e.g., a UE), comprising: at least one memory coupled with the at least one processor, with instructions stored in the at least one memory, the instructions being executable by the at least one processor, individually or in any combination, to cause the apparatus to perform a method of aspect 22.

Aspect 30: An apparatus (e.g., a UE) for wireless communication, comprising at least one means for performing a method of aspect 22.

Aspect 31: A non-transitory computer-readable medium storing code for wireless communication, the code comprising instructions executable by one or more processors to perform a method of any of aspect 22.

It should be noted that the methods described herein describe possible implementations. The operations and the steps may be rearranged or otherwise modified and other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, a graphics processing unit (GPU), a neural processing unit (NPU), an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk, and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database, or another data structure), ascertaining, and the like. Also, "determining" can include receiving (e.g., receiving information), accessing (e.g., accessing data stored in memory), and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label or other subsequent reference label.

The description set forth herein, in connection with the appended drawings, describes example configurations and does not represent all the examples that may be implemented or that are within the scope of the claims. The term "example" used herein means "serving as an example, instance, or illustration" and not "preferred" or "advantageous over other examples." The detailed description includes specific details for the purpose of providing an understanding of the described techniques. These techniques, however, may be practiced without these specific details. In some figures, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:

at least one processor; and at least one memory coupled with the at least one processor, with instructions stored in the at least one memory, the instructions being executable by the at least one processor to cause the apparatus to:

transmit a control message comprising a request for outer coding of source symbols of a data set and indicating a requested quantity of redundancy parity symbols for the data set;

receive, via a plurality of symbols, a first data set comprising outer-encoded data, the plurality of symbols comprising a plurality of source symbols and one or more redundancy parity symbols that correspond to the requested quantity of redundancy parity symbols; and decode the outer-encoded data received via the plurality of source symbols and at least one of the one or more redundancy parity symbols to obtain a message.

2. The apparatus of claim 1, wherein the instructions are further executable by the at least one processor to cause the apparatus to:

transmit a second control message requesting termination of transmission of one or more subsequent redundant parity symbols of the first data set based at least in part on successful decoding of the outer-encoded data to obtain the message.

3. The apparatus of claim 2, wherein the instructions are further executable by the at least one processor to cause the apparatus to:

transmit a third control message requesting termination of transmission of the one or more subsequent redundant parity symbols of the first data set based at least in part on a time duration elapsing or expiration of a timer following transmission of the second control message.

4. The apparatus of claim 3, wherein the instructions are further executable by the at least one processor to cause the apparatus to:

transmit uplink control information requesting feedback for the third control message.

5. The apparatus of claim 1, wherein the instructions are further executable by the at least one processor to cause the apparatus to:

transmit a second control message requesting termination of transmission of one or more subsequent redundant parity symbols of the first data set based at least in part on successful decoding of at least a defined quantity of the plurality of symbols of the first data set.

6. The apparatus of claim 5, wherein the second control message is transmitted subsequent to a time window elapsing after successful decoding of at least the defined quantity of the plurality of symbols of the first data set, the time window corresponding to a quantity of slots, a quantity of symbol periods, or a quantity of time.

7. The apparatus of claim 5, wherein the second control message is transmitted based at least in part on an expiration of a timer after successful decoding of at least the defined quantity of the plurality of symbols of the first data set.

8. The apparatus of claim 1, wherein the control message requests a first quantity of redundancy parity symbols for one or more data sets communicated during a first time window and a second quantity of redundancy parity symbols for one or more data sets communicated during a second time window.

9. The apparatus of claim 1, wherein the requested quantity of redundancy parity symbols is determined by a machine learning model based at least in part on historical data, a predicted traffic level, blockage data, a handover prediction, or any combination thereof.

10. The apparatus of claim 1, wherein the requested quantity of redundancy parity symbols is based at least in part on channel quality, channel state information, latency, a drop rate, or any combination thereof.

11. The apparatus of claim 1, wherein the control message requests a first quantity of redundancy parity symbols for the first data set and a second quantity of redundancy parity symbols for a second data set.

12. The apparatus of claim 1, wherein the control message comprises uplink control information, a medium access control control element, or a radio resource control message.

13. The apparatus of claim 1, wherein the control message is an aperiodic control message or the control message is one of a plurality of control messages that are periodically transmitted.

14. An apparatus, comprising:

at least one processor; and at least one memory coupled with the at least one processor, with instructions stored in the at least one memory, the instructions being executable by the at least one processor to cause the apparatus to:

obtain a control message comprising a request for outer coding of source symbols of a data set and indicating a requested quantity of redundancy parity symbols for the data set; and output, via a plurality of symbols, a first data set comprising outer-encoded data, the plurality of symbols comprising a plurality of source symbols and one or more redundancy parity symbols that correspond to the requested quantity of redundancy parity symbols.

15. The apparatus of claim 14, wherein the instructions are further executable by the at least one processor to cause the apparatus to:

obtain a second control message requesting termination of transmission of one or more subsequent redundant parity symbols of the first data set; and terminate transmission of the one or more subsequent redundant parity symbols of the first data set based at least in part on the second control message.

16. The apparatus of claim 14, wherein the instructions are further executable by the at least one processor to cause the apparatus to:

obtain uplink control information requesting feedback for a second control message that requests termination of transmission of one or more subsequent redundant parity symbols of the first data set; and output a feedback message indicating whether the second control message was successfully received.

17. The apparatus of claim 14, wherein the instructions are further executable by the at least one processor to cause the apparatus to:

obtain uplink control information comprising feedback associated with decoding of at least a defined quantity of the plurality of symbols of the first data set; and terminate transmission of one or more subsequent redundant parity symbols of the first data set based at least in part on a quantity of successfully received symbols indicated by the feedback satisfying a threshold quantity of received symbols or based at least in part on a quantity of estimated successfully decoded symbols satisfying a threshold quantity of decoded symbols.

18. A method for wireless communication by an apparatus, comprising:

transmitting a control message comprising a request for outer coding of source symbols of a data set and indicating a requested quantity of redundancy parity symbols for the data set;

receiving, via a plurality of symbols, a first data set comprising outer-encoded data, the plurality of symbols comprising a plurality of source symbols and one or more redundancy parity symbols that correspond to the requested quantity of redundancy parity symbols; and decoding the outer-encoded data received via the plurality of source symbols and at least one of the one or more redundancy parity symbols to obtain a message.

19. The method of claim 18, further comprising:

transmitting a second control message requesting termination of transmission of one or more subsequent redundant parity symbols of the first data set based at least in part on successful decoding of the outer-encoded data to obtain the message.

20. The method of claim 19, further comprising:

transmitting a third control message requesting termination of transmission of the one or more subsequent redundant parity symbols of the first data set based at least in part on a time duration elapsing or expiration of a timer following transmission of the second control message.

* * * * *